(12) United States Patent
Geng et al.

(10) Patent No.: US 11,579,425 B1
(45) Date of Patent: Feb. 14, 2023

(54) NARROW-BAND PERIPHERAL SEE-THROUGH PANCAKE LENS ASSEMBLY AND DISPLAY DEVICE WITH SAME

(71) Applicant: META PLATFORMS TECHNOLOGIES, LLC, Menlo Park, CA (US)

(72) Inventors: Ying Geng, Bellevue, WA (US); Brian Wheelwright, Sammamish, WA (US); Jacques Gollier, Sammamish, WA (US); Yusufu Njoni Bamaxam Sulai, Snohomish, WA (US); Babak Amirsolaimani, Redmond, WA (US); Weichuan Gao, Redmond, WA (US); Gang Li, Bothell, WA (US); Mengfei Wang, Seattle, WA (US); Fenglin Peng, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 10 days.

(21) Appl. No.: 16/848,652

(22) Filed: Apr. 14, 2020

Related U.S. Application Data

(63) Continuation-in-part of application No. 16/532,311, filed on Aug. 5, 2019.

(51) Int. Cl.
*G02B 17/08* (2006.01)
*G02B 3/08* (2006.01)

(52) U.S. Cl.
CPC ............. *G02B 17/086* (2013.01); *G02B 3/08* (2013.01)

(58) Field of Classification Search
CPC ............ G02B 27/0172; G02B 27/0174; G02B 2027/0178
See application file for complete search history.

(56) References Cited

U.S. PATENT DOCUMENTS 6,075,651 A * 6/2000 Hoppe ............... G02B 27/0172
359/641
6,094,242 A 7/2000 Yamanaka
(Continued)

FOREIGN PATENT DOCUMENTS

FR 2690534 A1 10/1993
GB 2384059 A 7/2003
(Continued)

OTHER PUBLICATIONS

Ex Parte Quayle Office action dated Dec. 1, 2020 for U.S. Appl. No. 16/810,417, filed Mar. 5, 2020, 9 pages.
(Continued)

*Primary Examiner* — Christopher Stanford
(74) *Attorney, Agent, or Firm* — Morgan, Lewis & Bockius LLP

(57) ABSTRACT

An optical assembly includes at least one substrate that provides a first curved surface and a second surface. The optical assembly also includes a beam splitter on the first curved surface, a reflector on the second surface, and an optical retarder disposed between the beam splitter and the reflector. The optical assembly is configured to transmit the first light through the optical assembly at a first optical power. The optical assembly is also configured to transmit second light through peripheral portions of the optical assembly at a second optical power that is less than the first optical power. The first light includes light having a first polarization and wavelengths within a predetermined wavelength range. The second light includes light having wavelengths within the predetermined wavelength range and a second polarization orthogonal to the first polarization, as well as light having wavelengths outside the predetermined wavelength range.

16 Claims, 23 Drawing Sheets

(56) References Cited

U.S. PATENT DOCUMENTS

| | | | |
|---|---|---|---|
| 6,373,603 | B1 | 4/2002 | Popovich et al. |
| 6,563,638 | B2 * | 5/2003 | King ................ G02B 27/283 |
| | | | 359/485.05 |
| 7,573,640 | B2 | 8/2009 | Nivon et al. |
| 7,946,708 | B2 | 5/2011 | Sakata et al. |
| 8,305,690 | B2 * | 11/2012 | Ruhle ................. G02B 5/3016 |
| | | | 349/98 |
| 8,570,656 | B1 | 10/2013 | Weissman |
| 8,698,713 | B2 | 4/2014 | Hajjar et al. |
| 8,724,206 | B2 | 5/2014 | Spitzer et al. |
| 8,941,559 | B2 | 1/2015 | Bar-Zeev et al. |
| 8,964,298 | B2 | 2/2015 | Haddick et al. |
| 9,087,471 | B2 | 7/2015 | Miao |
| 9,251,745 | B2 | 2/2016 | Sprague |
| 9,507,066 | B2 | 11/2016 | Kollin et al. |
| 9,519,084 | B1 * | 12/2016 | Thomas ................ B29C 39/10 |
| 9,557,568 | B1 | 1/2017 | Ouderkirk et al. |
| 10,095,036 | B2 | 10/2018 | Carollo et al. |
| 10,274,805 | B2 | 4/2019 | Tabirian et al. |
| 10,429,647 | B2 | 10/2019 | Gollier et al. |
| 10,495,798 | B1 | 12/2019 | Peng et al. |
| 10,578,873 | B2 | 3/2020 | Lee et al. |
| 10,634,907 | B1 | 4/2020 | Geng et al. |
| 10,663,745 | B2 | 5/2020 | Ouderkirk et al. |
| 10,976,551 | B2 | 4/2021 | Cobb |
| 10,996,466 | B2 | 5/2021 | Amirsolaimani et al. |
| 11,002,970 | B2 * | 5/2021 | Martinez ................ G02B 5/08 |
| 11,022,803 | B2 * | 6/2021 | Lee ........................ G02F 1/137 |
| 11,054,648 | B2 | 7/2021 | Carollo et al. |
| 11,067,810 | B2 | 7/2021 | Yonekubo et al. |
| 11,086,127 | B2 * | 8/2021 | Nishiyama ......... G02B 27/0172 |
| 11,269,123 | B2 * | 3/2022 | Sharp ...................... G02C 7/088 |
| 2004/0108971 | A1 | 6/2004 | Waldern et al. |
| 2004/0109208 | A1 | 6/2004 | Amanai et al. |
| 2006/0221448 | A1 | 10/2006 | Nivon et al. |
| 2010/0053121 | A1 | 3/2010 | Sprague |
| 2011/0096100 | A1 | 4/2011 | Sprague |
| 2013/0101253 | A1 | 4/2013 | Popovich et al. |
| 2013/0314793 | A1 | 11/2013 | Robbins et al. |
| 2014/0168034 | A1 | 6/2014 | Luebke et al. |
| 2014/0268879 | A1 | 9/2014 | Mizuyama et al. |
| 2015/0235460 | A1 | 8/2015 | Schowengerdt et al. |
| 2015/0378074 | A1 * | 12/2015 | Kollin ................. G02B 5/3016 |
| | | | 359/485.05 |
| 2016/0026253 | A1 | 1/2016 | Bradski et al. |
| 2016/0363777 | A1 | 12/2016 | Flynn et al. |
| 2017/0016594 | A1 | 1/2017 | Di Trapani et al. |
| 2017/0068102 | A1 | 3/2017 | Wong et al. |
| 2017/0153454 | A1 | 6/2017 | Callier et al. |
| 2017/0255015 | A1 | 9/2017 | Geng et al. |
| 2017/0285347 | A1 | 10/2017 | Cai et al. |
| 2017/0293148 | A1 | 10/2017 | Park et al. |
| 2017/0336552 | A1 | 11/2017 | Masuda et al. |
| 2018/0029319 | A1 | 2/2018 | Kalima et al. |
| 2018/0107007 | A1 | 4/2018 | Wyrwas et al. |
| 2018/0172988 | A1 | 6/2018 | Ahmed et al. |
| 2018/0180788 | A1 | 6/2018 | Ambur et al. |
| 2018/0239145 | A1 | 8/2018 | Lanman et al. |
| 2018/0239147 | A1 | 8/2018 | Schowengerdt et al. |
| 2018/0267222 | A1 | 9/2018 | Ambur et al. |
| 2019/0018480 | A1 | 1/2019 | Aleem et al. |
| 2019/0018481 | A1 | 1/2019 | Aleem et al. |
| 2019/0025602 | A1 * | 1/2019 | Qin ....................... G02B 27/123 |
| 2019/0041642 | A1 | 2/2019 | Haddick et al. |
| 2019/0060602 | A1 | 2/2019 | Tran et al. |
| 2019/0072767 | A1 | 3/2019 | Vallius et al. |
| 2019/0094549 | A1 | 3/2019 | Nicholson et al. |
| 2019/0235235 | A1 | 8/2019 | Ouderkirk et al. |
| 2019/0265477 | A1 | 8/2019 | Perreault et al. |
| 2019/0353906 | A1 | 11/2019 | Gollier et al. |
| 2019/0369403 | A1 | 12/2019 | Leister |
| 2020/0050008 | A1 | 2/2020 | Seo et al. |
| 2020/0089002 | A1 | 3/2020 | Lee |
| 2020/0096816 | A1 | 3/2020 | Lee et al. |
| 2020/0124858 | A1 | 4/2020 | Cakmakci |
| 2020/0133005 | A1 | 4/2020 | Yonekubo et al. |
| 2020/0133017 | A1 | 4/2020 | Ide |
| 2020/0249480 | A1 | 8/2020 | Martinez et al. |
| 2020/0348530 | A1 | 11/2020 | Xiao et al. |
| 2020/0379226 | A1 | 12/2020 | Steiner et al. |
| 2021/0080726 | A1 | 3/2021 | Geng et al. |
| 2021/0271082 | A1 | 9/2021 | Smith et al. |
| 2021/0278679 | A1 | 9/2021 | Ouderkirk et al. |
| 2021/0286183 | A1 | 9/2021 | Ouderkirk et al. |
| 2021/0294012 | A1 | 9/2021 | Wong et al. |

FOREIGN PATENT DOCUMENTS

| | | |
|---|---|---|
| WO | 2018221867 A1 | 12/2018 |
| WO | 2019104046 A1 | 5/2019 |

OTHER PUBLICATIONS

Final Office Action dated Oct. 25, 2021 for U.S. Appl. No. 16/810,494, filed Mar. 5, 2020, 11 pages.

International Search Report and Written Opinion for International Application No. PCT/US2020/050776, dated Mar. 15, 2021, 23 Pages.

International Search Report and Written Opinion for International Application No. PCT/US2020/050782, dated Mar. 9, 2021, 16 Pages.

International Search Report and Written Opinion for International Application No. PCT/US2021/013968, dated Jun. 30, 2021, 13 pages.

Invitation to Pay Additional Fees for International Application No. PCT/US2021/013968, dated May 7, 2021, 9 pages.

Moon S., et al., "Layered Display with Accommodation Cue Using Scattering Polarizers," IEEE Journal of Selected Topics in Signal Processing, IEEE, US, Oct. 23, 2017, vol. 11 (7), pp. 1223-1231.

Non-Final Office Action dated Sep. 3, 2021 for U.S. Appl. No. 16/810,471, filed Mar. 5, 2020, 21 pages.

Non-Final Office Action dated Oct. 6, 2020 for U.S. Appl. No. 16/810,445, filed Mar. 5, 2020, 11 pages.

Non-Final Office Action dated Apr. 27, 2021 for U.S. Appl. No. 16/810,494, filed Mar. 5, 2020, 11 Pages.

Non-Final Office Action dated Jul. 29, 2021 for U.S. Appl. No. 16/810,431, filed Mar. 5, 2020, 12 Pages.

Notice of Allowance dated Jan. 12, 2021 for U.S. Appl. No. 16/810,417, filed Mar. 5, 2020, 6 pages.

Notice of Allowance dated Mar. 19, 2021 for U.S. Appl. No. 16/810,485, filed Mar. 5, 2020, 12 pages.

Notice of Allowance dated Jan. 27, 2021 for U.S. Appl. No. 16/810,445, filed Mar. 5, 2020, 9 pages.

Non-Final Office Action dated Oct. 7, 2021 for U.S. Appl. No. 16/782,604, filed Feb. 5, 2020, 17 pages.

Non-Final Office Action dated Oct. 7, 2021 for U.S. Appl. No. 16/784,718, filed Feb. 7, 2020, 14 pages.

Aye et al., "Compact HMD opics based on multiplexed aberration-compensated holograhpic optical elements," Proceedings of SPIE, Event: Aerospace/Defense Sensing, Simulation, and Controls, 2001, Orlando, FL, 10 pgs.

LaRussa et al., "The Holographic Pancake Window," Proceedings of SPIE 1978, Event: 22nd Annual Technical Symposium, 1978, San Diego, 11 pgs.

Margarinos et al., "Wide Angle, Color, Hologrpahic Infinity Optics Display—Final Report," Farrand Optical Co., Valhalla, NY, Rort No. AFHRL-TR-80-53, Mar. 1981, downloaded from https://files.eric.ed.gov/fulltext/ED202467.pdf, 93 pgs.

Final Office Action dated Feb. 4, 2022 for U.S. Appl. No. 16/810,458, filed Mar. 5, 2020, 20 pages.

Final Office Action dated Nov. 15, 2021 for U.S. Appl. No. 16/810,431, filed Mar. 5, 2020, 14 pages.

Non-Final Office Action dated Feb. 2, 2022 for U.S. Appl. No. 17/241,921, filed Apr. 27, 2021, 7 pages.

Non-Final Office Action dated Feb. 9, 2022 for U.S. Appl. No. 16/532,311, filed Aug. 5, 2019, 10 pages.

Notice of Allowance dated Feb. 28, 2022 for U.S. Appl. No. 16/810,494, filed Mar. 5, 2020, 5 pages.

(56) References Cited

OTHER PUBLICATIONS

Notice of Allowance dated Jan. 31, 2022 for U.S. Appl. No. 16/810,494, filed Mar. 5, 2020, 8 pages.
Notice of Allowance dated Feb. 8, 2022 for U.S. Appl. No. 16/782,604, filed Feb. 5, 2020, 9 pages.
Notice of Allowance dated Feb. 8, 2022 for U.S. Appl. No. 16/784,718, filed Feb. 7, 2020, 9 pages.
Final Office Action dated Jul. 1, 2022 for U.S. Appl. No. 16/810,458, filed Mar. 5, 2020, 27 pages.
Final Office Action dated Apr. 21, 2022 for U.S. Appl. No. 16/810,471, filed Mar. 5, 2020, 24 pages.
International Preliminary Report on Patentability for International Application No. PCT/US2020/050776, dated Mar. 31, 2022, 18 pages.
International Preliminary Report on Patentability for International Application No. PCT/US2020/050782, dated Mar. 31, 2022, 12 pages.
Notice of Allowance dated Jun. 1, 2022 for U.S. Appl. No. 16/810,494, filed Mar. 5, 2020, 5 pages.
Notice of Allowance dated May 12, 2022 for U.S. Appl. No. 17/241,921, filed Apr. 27, 2021, 7 pages.
Notice of Allowance dated Apr. 15, 2022 for U.S. Appl. No. 16/810,431, filed Mar. 5, 2020, 10 pages.
Notice of Allowance dated Jun. 20, 2022 for U.S. Appl. No. 16/532,311, filed Aug. 5, 2019, 8 pages.
Notice of Allowance dated Aug. 23, 2022 for U.S. Appl. No. 17/241,921, filed Apr. 27, 2021, 2 pages.
Notice of Allowance dated Apr. 26, 2022 for U.S. Appl. No. 16/810,431, filed Mar. 5, 2020, 04 pages.
Notice of Allowance dated Mar. 29, 2022 for U.S. Appl. No. 16/810,494, filed Mar. 5, 2020, 5 pages.

* cited by examiner

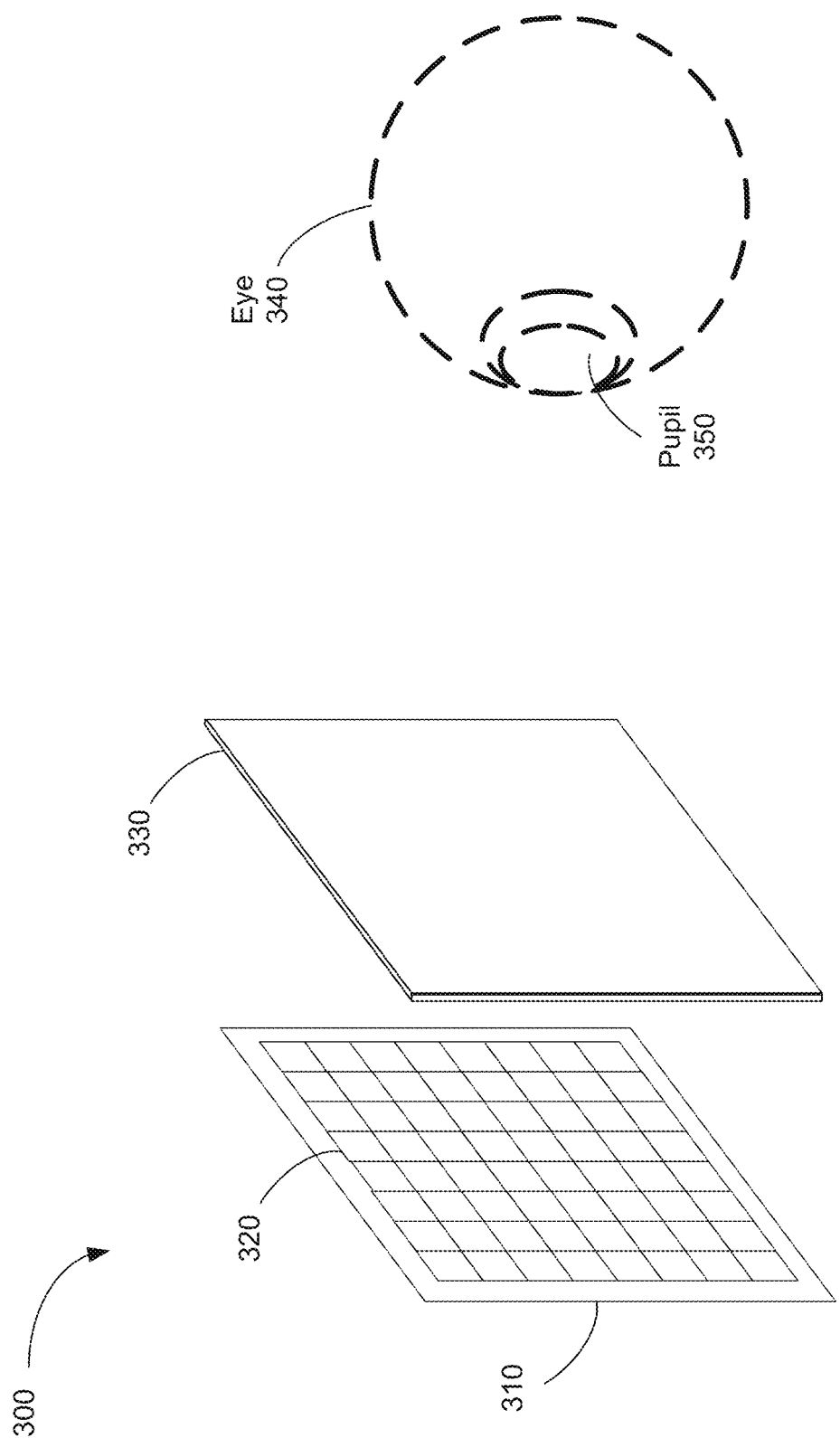

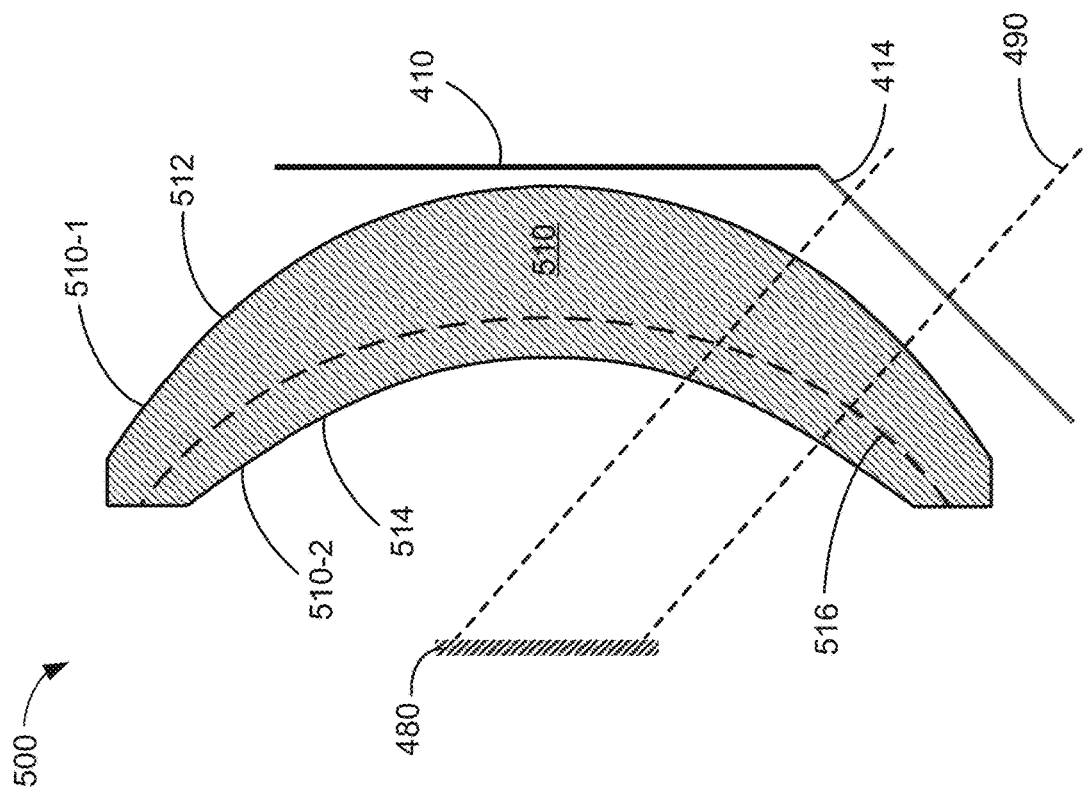
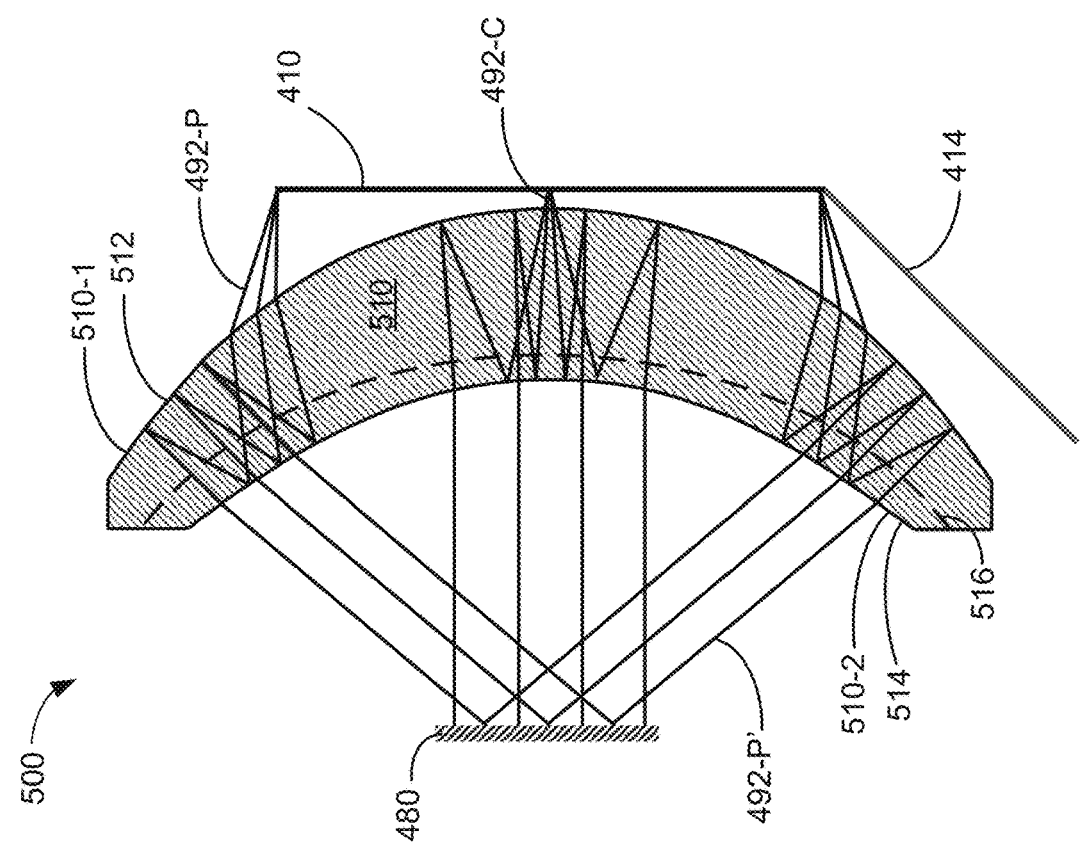
Figure 5B
Figure 5A

800

810 Transmit image light, including:

812 Receive the image light at a beam splitter on a first curved surface provided by a first substrate, at least a portion of the first curved surface having a first radius of curvature.

814 Reflecting the image light at a reflector on a second surface provided by the first substrate or a second substrate, at least a portion of the second surface having a second radius of curvature that is different from the first radius of curvature.

816 Reflecting the image light at the beam splitter.

818 Outputting the image light from the reflector at a first optical power.

820 Transmitting ambient light through a peripheral portion of the optical assembly at a second optical power that is less than the first optical power, the transmitting including:

822 Receiving the ambient light at a peripheral portion of the first surface.

824 Transmitting the ambient light through a peripheral portion of the reflector without reflection at the reflector.

Figure 8

NARROW-BAND PERIPHERAL SEE-THROUGH PANCAKE LENS ASSEMBLY AND DISPLAY DEVICE WITH SAME

RELATED APPLICATIONS

This application is a continuation-in-part application of U.S. patent application Ser. No. 16/532,311, entitled "Peripheral See-Through Pancake Lens Assembly and Display Device with Same," filed Aug. 5, 2019, which is incorporated by reference herein in its entirety.

This application is related to (1) U.S. patent application Ser. No. 16/810,417, filed Mar. 5, 2020, entitled "Thin See-Through Pancake Lens Assembly And Display Device Including The Same", (2) U.S. patent application Ser. No. 16/810,431, filed Mar. 5, 2020, entitled "Curved See-Through Pancake Lens Assembly and Display Device Including the Same", (3) U.S. patent application Ser. No. 16/810,445, filed Mar. 5, 2020, entitled "Lens Assembly Including a Volume Bragg Grating and Display Device Including the Same", (4) U.S. patent application Ser. No. 16/810,458, filed Mar. 5, 2020, entitled "Display Device with Transparent Emissive Display and See-Through Lens Assembly", (5) U.S. patent application Ser. No. 16/810,471, filed Mar. 5, 2020, entitled "Display Device with Holographic Diffuser Display and See-Through Lens Assembly", (6) U.S. patent application Ser. No. 16/810,485, filed Mar. 5, 2020, entitled "Display Device with Switchable Diffusive Display and See-Through Lens Assembly", and (7) U.S. patent application Ser. No. 16/810,494, filed Mar. 5, 2020, entitled "Display Device with Diffusive Display and See-Through Lens Assembly", all of which are incorporated by reference herein in their entireties.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, some head-mounted display devices are used for virtual reality and augmented reality operations.

When using head-mounted display devices, it may be desirable for the user to be able to observe the outside environment. For instance, while using the head-mounted display device, a user may want to look down at his or her hands in order to view a keyboard, mouse, or controller, or to interact with adjacent objects, such as grabbing a cup of tea, without having to remove the head-mounted display device.

SUMMARY

Accordingly, there is a need for a head-mounted display device that allows ambient light to be transmitted to a peripheral portion of a user's field-of-view so that the user may view the outside environment without taking off or turning off the head-mounted display.

Thus, the above deficiencies and other problems associated with conventional head-mounted displays are reduced or eliminated by the disclosed display devices.

In accordance with some embodiments, an optical assembly includes at least one substrate that provides a first curved surface and a second surface. At least a portion of the first curved surface has a first radius of curvature and the second surface has a second radius of curvature that is different from the first radius of curvature. The optical assembly also includes a beam splitter on the first curved surface, a reflector on the second surface, and an optical retarder disposed between the beam splitter and the reflector. The optical assembly is configured to receive first light at the first curved surface and reflect the first light at the reflector and subsequently, at the beam splitter before outputting the first light from the reflector. The first light is transmitted through the optical assembly at a first optical power. The optical assembly is also configured to transmit second light at a second optical power that is less than the first optical power. The second light is transmitted through peripheral portions of the beam splitter and reflector without reflection at the reflector.

In accordance with some embodiments, a display device includes a window that is configurable to transmit or block ambient light and a display configured to output image light. The window and the display define an interior space of the display device. The display device also includes an optical assembly disposed in the interior space of the display device. The optical assembly includes at least one substrate that provides a first curved surface and a second surface. At least a portion of the first curved surface has a first radius of curvature and the second surface has a second radius of curvature that is different from the first radius of curvature. The optical assembly also includes a beam splitter on the first curved surface, a reflector on the second surface, and an optical retarder disposed between the beam splitter and the reflector. The optical assembly is configured to receive image light at the first curved surface and reflect the image light at the reflector and subsequently, at the beam splitter before outputting the image light from the reflector. The image light is transmitted through the optical assembly at a first optical power. The optical assembly is also configured to transmit ambient light at a second optical power that is less than the first optical power. The ambient light is transmitted through peripheral portions of the beam splitter and reflector without reflection at the reflector.

In accordance with some embodiments, a method of transmitting light through an optical assembly includes transmitting image light. Transmitting the image light includes receiving the image light at a beam splitter on a first curved surface that is provided by at least one substrate. At least a portion of the first curved surface has a first radius of curvature. Transmitting the image light also includes reflecting the image light at a reflector on a second surface that is provided by the first substrate of a second substrate. At least a portion of the second surface has a second radius of curvature that is different from the first radius of curvature. Transmitting the image light further includes reflecting the image light at the beam splitter and outputting the image light from the reflector at a first optical power. The method also includes transmitting ambient light through a peripheral portion of the optical assembly at a second optical power that is less than the first optical power. Transmitting the ambient light includes receiving the ambient light at a peripheral portion of the first surface, and transmitting the ambient light through a peripheral portion of the reflector without reflection at the reflector.

Thus, the disclosed embodiments provide a display device capable of switching between a normal mode and a see-through mode to selectively allow external or ambient light to enter the eyes of a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 5A-5C are schematic diagrams illustrating an optical assembly including a meniscus lens in accordance with some embodiments.

FIGS. 5G-5I are schematic diagrams illustrating an optical assembly including a meniscus lens in accordance with some embodiments.

FIG. 8 is a flowchart illustrating a method of transmitting light through an optical assembly in accordance with some embodiments.

These figures are not drawn to scale unless indicated otherwise.

DETAILED DESCRIPTION

The present disclosure provides a head-mounted display device (or display device) that allows ambient light to be transmitted to a peripheral portion of a user's field-of-view. In some embodiments, the ambient light is transmitted to the viewer without significant optical aberrations from the optical components of the display device, in order to allow the user of the display device to accurately perceive and interact with objects in the outside environment.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
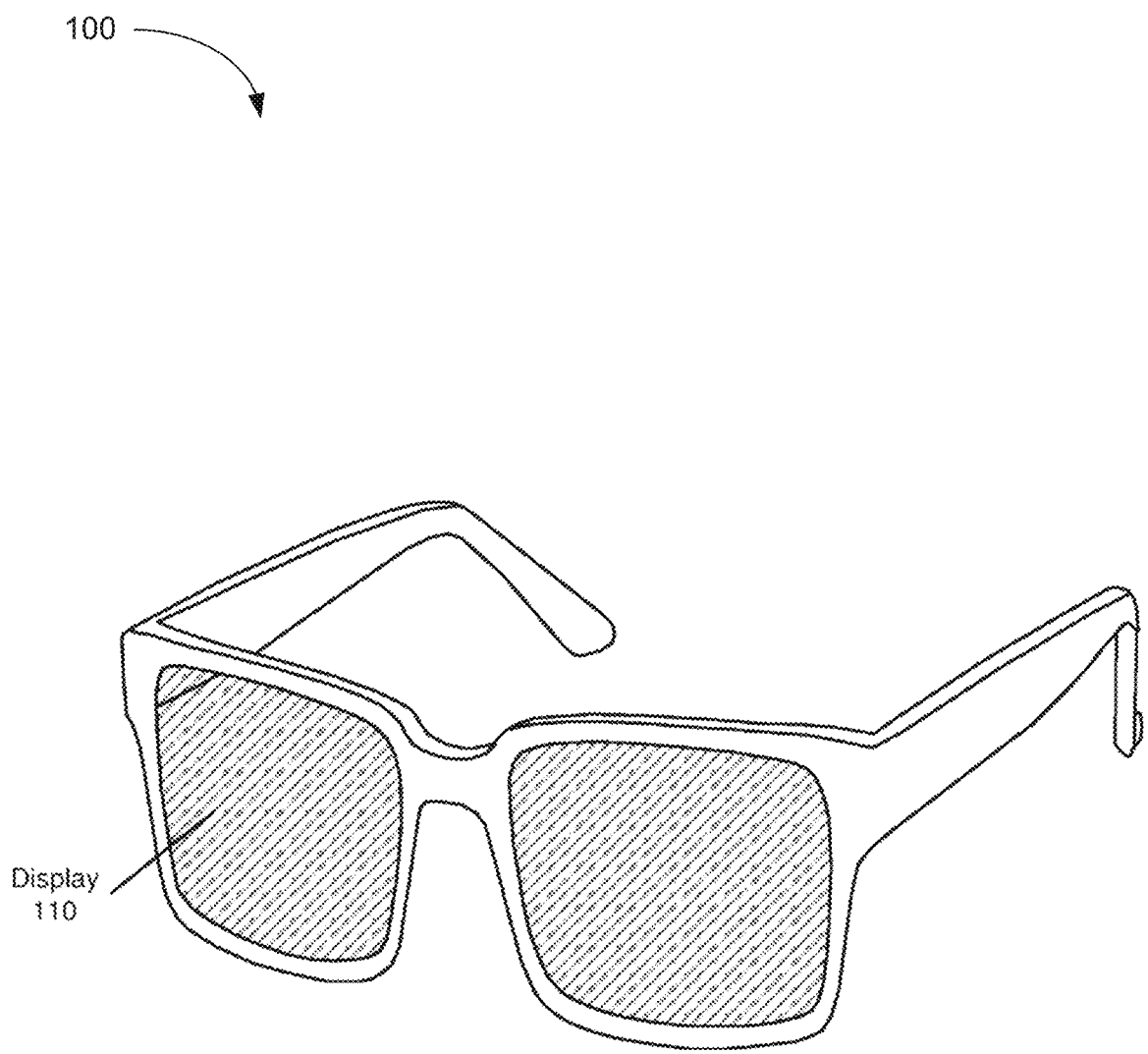
FIG. 1 is a perspective view of a display device in accordance with some embodiments.

FIG. 1 illustrates a perspective view of display device 100 in accordance with some embodiments. In some embodiments, display device 100 is configured to be worn on a head of a user (e.g., by having the form of spectacles or eyeglasses, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). Display device 100 includes display 215 (described with respect to FIG. 2). Display 215 is configured for presenting visual contents (e.g., augmented reality contents, virtual reality contents, mixed-reality contents, or any combination thereof) to a user.

Figure 2:
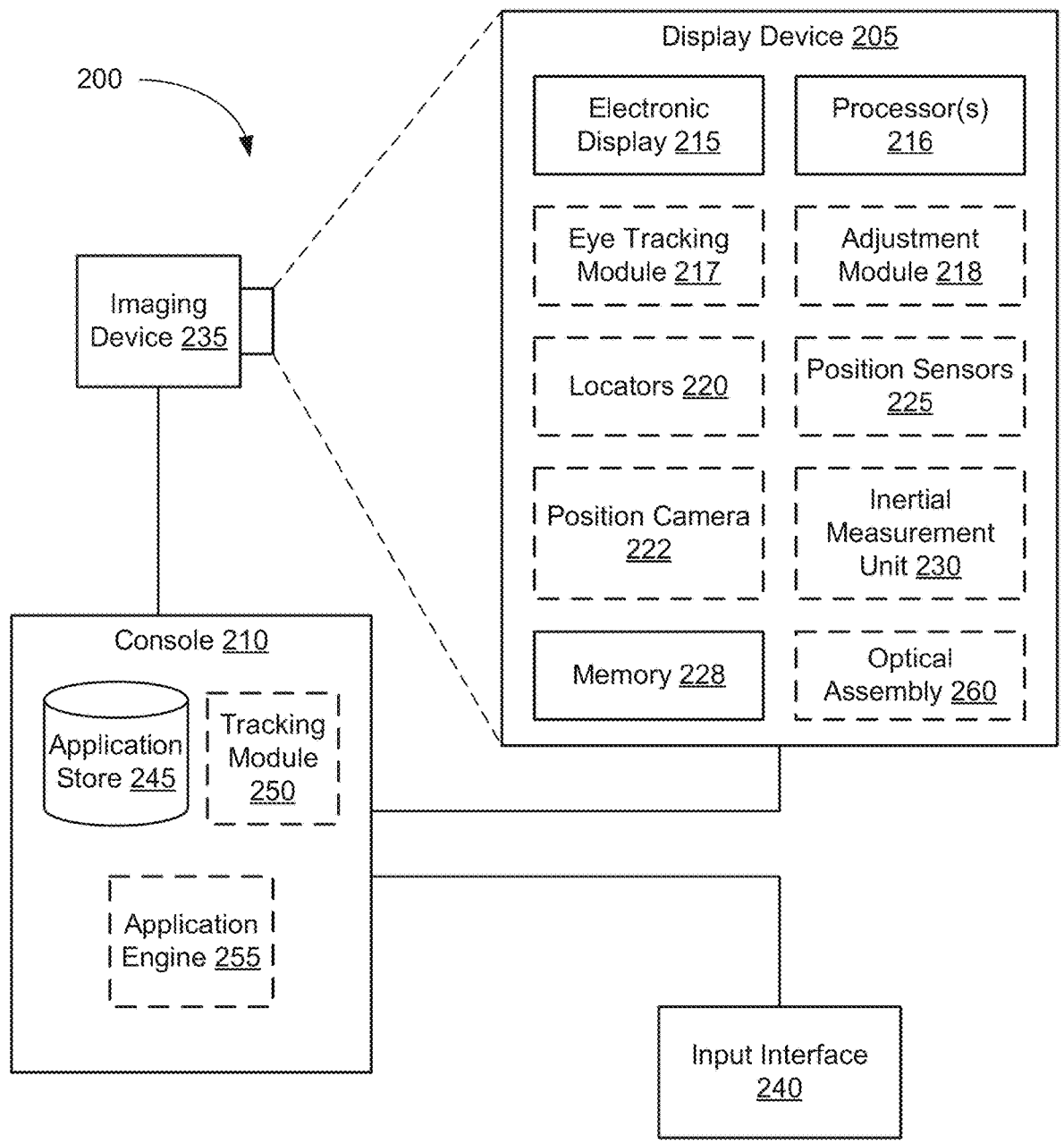
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of a display device 300, which corresponds to part of or all of display device 100 (see FIG. 1) in accordance with some embodiments. In some embodiments, display device 300 includes an emission surface 310 (e.g., a light emission device array or reflective element), and an optical assembly (e.g., optical assembly 260) having one or more optical components 330 (e.g., lenses). In some embodiments, display device 300 also includes an IR detector array.

In some embodiments, emission surface 310 emits image light and optional IR light toward the optical components 330. Emission surface 310 may be, e.g., an array of LEDs, an array of microLEDs, an array of OLEDs, or some combination thereof. Emission surface 310 includes light emission devices 320 that emit light in the visible light (and optionally includes devices that emit light in the IR).

In some embodiments, display device 300 includes an emission intensity array configured to selectively attenuate light emitted from emission surface 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from emission surface 310 is passed to the one or more optical components 330. In some embodiments, display device 300 uses an emission intensity array to facilitate providing image light to a location of pupil 350 of eye 340 of a user, and minimize the amount of image light provided to other areas in the eyebox.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from emission surface 310. In some embodiments, the IR detector array is integrated into emission surface 310.

In some embodiments, emission surface 310 and an emission intensity array make up a display element. Alternatively, the display element includes emission surface 310 (e.g., when emission surface 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more optical components 330 toward the determined location of pupil 350, and not toward another presumed location.

In some embodiments, display device 300 includes one or more broadband sources (e.g., one or more white LEDs) coupled with a plurality of color filters, in addition to, or instead of, emission surface 310.

One or more optical components 330 receive the image light (or modified image light, e.g., attenuated light) from emission surface 310, and direct the image light to a detected or presumed location of the pupil 350 of an eye 340 of a user. In some embodiments, the one or more optical components include one or more optical assemblies 260.

Figure 4A:
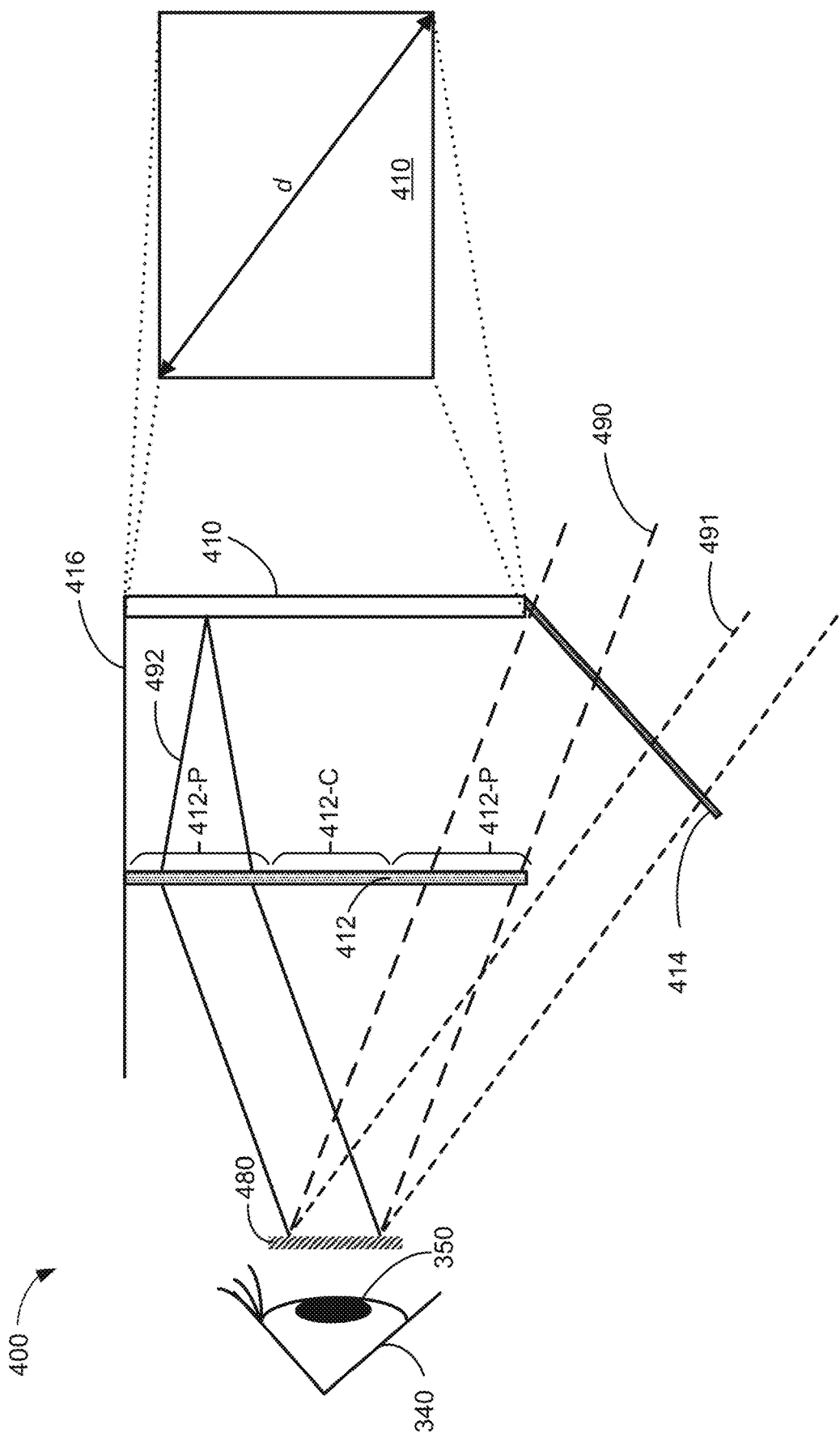
FIGS. 4A-4B are schematic diagrams illustrating a display device in accordance with some embodiments.
Figure 4B:
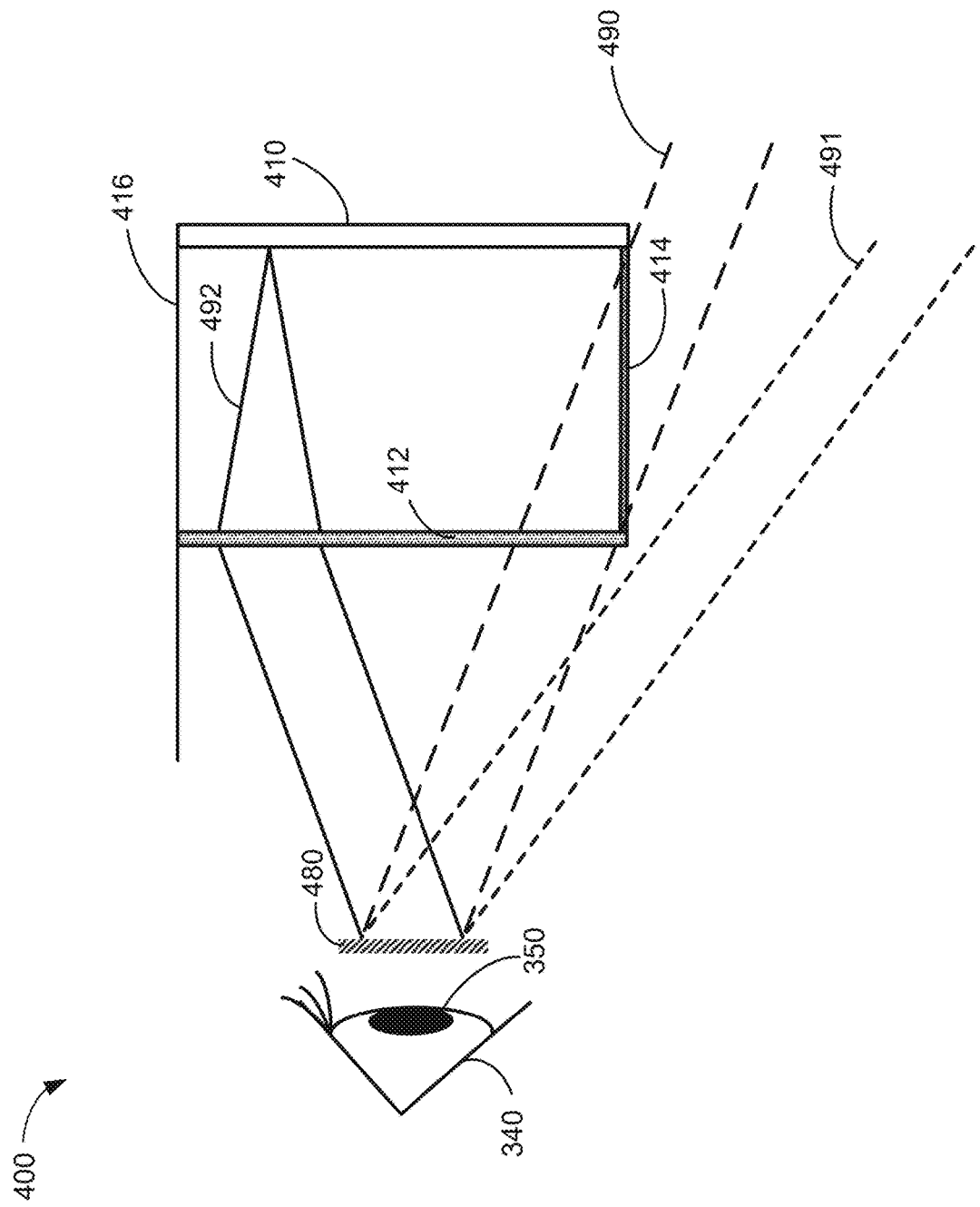

FIGS. 4A-4B are schematic diagrams illustrating display device 400 in accordance with some embodiments. As shown in FIG. 4A, display device 400 includes display 410 and optical assembly 412. Display device 400 may also include switchable window 414 and/or frame 416. In some embodiments, frame 416, display 410, and switchable window 414 form a housing and define an interior space for display device 400. Optical assembly 412 is disposed inside the housing (e.g., in the interior space) between display 410 and a user's eyes 340 (when the device is in use). In some embodiments, display device 400 is a head-mounted display device and the shape and dimensions of frame 416 and optical assembly 412 are designed to avoid interference with a user's brow bone. In such cases, is desirable for display device to be compact and light-weight. Thus, in some embodiments, display 410 has a display size (e.g., diagonal dimension d, shown in FIG. 4A) that is between approximately 1.3 inches and 3.2 inches (e.g., 1.3 inches≤d≤3.2 inches). In some embodiments, display 410 is configured to output image light 492 that is directed to an eye 340 (e.g., display device 400 includes two displays 410, one for each eye 340).

In some embodiments, switchable window 414 is configurable to block ambient light 490 and 491 or allow transmission of ambient light 490 and 491 originating from outside the housing, such as light from the environment outside display device 400. As shown, some of the ambient light (e.g., ambient light 490) is transmitted through switchable window 414 and optical assembly 412 before reaching eyebox 480. As also shown, some of the ambient light (e.g., ambient light 491) enters the interior space for display device 400 through switchable window 414 and propagates towards eyebox 480 without being transmitted through optical assembly 412.

In some embodiments, as shown, switchable window 414 has a planar (e.g., flat) shape. Alternatively, switchable window 414 may have a different shape than a planar or flat shape. For example, switchable window 414 may have a curved shape that conforms with a shape of a user's head. Additionally, although not shown, switchable window 414 may be located at the top or sides of frame 416 such that light may enter peripheral portions of display device 400 via switchable window 414 to provide a fully immersive experience (e.g., that includes ambient light entering from the top, sides, and/or bottom of display device 400). In some embodiments, switchable window 414 is polarization dependent and is configured to transmit light having a specific polarization. Alternatively, switchable window 414, may be polarization independent, allowing all incident light to be transmitted, or a combination of both polarization dependent and polarization independent. For example, switchable window 414 may be configured to be switchable between being polarization dependent and polarization independent. In another example, a first portion (e.g., bottom portion, near a user's cheek) of switchable window 414 may be polarization dependent while a second portion (e.g., top portion, near a user's brow) of switchable window 414 may be polarization independent.

As shown in FIGS. 4A-4B, display 410 is configured to output image light 492. Referring to FIG. 4A, optical assembly 412 has a central portion 412-C and a peripheral portion 412-P that surrounds the central portion 412-C. Optical assembly 412 is configured to receive image light 492 output from display 410 and to transmit image light 492 at a first optical power toward an eyebox 480 representing the pupil 350 of an eye 340 of a user. For example, image light 492 output from display 410 is focused and/or collimated as it is transmitted through optical assembly 412. Optical assembly 412 is also configured to receive and transmit ambient light 490 through peripheral portion 412-P of optical assembly 412 toward eyebox 480 at a second optical power that is less than the first optical power. In some embodiments, the second optical power is zero. In some embodiments, optical assembly 412 is configured to transmit the ambient light 490 without adding significant optical aberrations.

In some embodiments, as shown in FIG. 4B, switchable window 414 may be disposed between display 410 and optical assembly 412 such that a first edge of switchable window 414 is adjacent to display 410 and a second edge, opposite the first end, of switchable window 414 is adjacent to optical assembly 412.

Figure 5C:
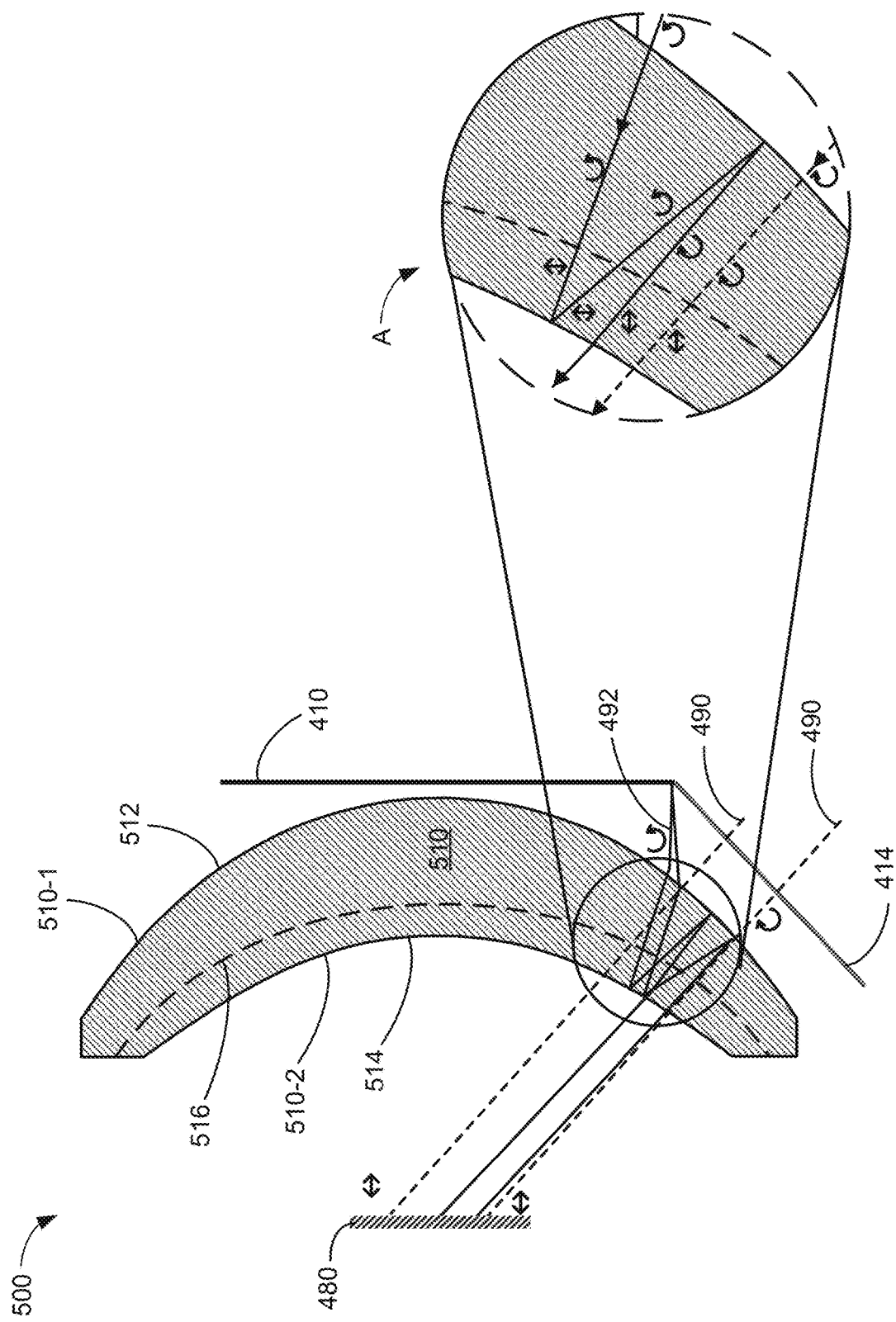

FIGS. 5A-5C are schematic diagrams illustrating optical assembly 500, corresponding to optical assembly 412, in accordance with some embodiments. Optical assembly 500 includes a substrate 510 that provides opposing curved surfaces 510-1 and 510-2. At least a portion of curved surface 510-1 has a first radius of curvature, and at least a portion of curved surface 510-2 has a second radius of curvature. In some embodiments, the first radius of curvature and the second radius of curvature are the same. Alternatively, the first radius of curvature and the second radius of curvature may be different from one another. Optical assembly 500 also includes a beam splitter 512 disposed on curved surface 510-1, a reflector 514 (e.g., reflective polarizer) disposed on curved surface 510-2, and an optical retarder 516 (e.g., quarter-wave plate) that is disposed between beam splitter 512 and reflector 514. Optical retarder 516 has a third radius of curvature. In some embodiments, the optical retarder 516 is apart from the reflector 514, as shown. In some embodiments, optical retarder has a spherical curve. Alternatively, optical retarder 516 may have a one-dimensional curve (e.g., is curved in only one direction, such as a cylindrical shape). Alternatively, optical retarder 516 and reflector 514 may be two layers of optical coatings that are stacked or laminated on curved surface 510-2. In such cases, the third radius of curvature is equal to the second radius of curvature. In some embodiments, optical retarder may be stacked or laminated with beam splitter 512. In such cases, the third radius of curvature is the same as the first radius of curvature.

FIG. 5A illustrates image light 492-C output from a central portion and transmitted through a central portion (e.g., corresponding to central portion 412-C of optical assembly 412), and image light 492-P and 492-P' output from a peripheral portions of display 410 and transmitted through a peripheral portion (e.g., a corresponding to peripheral portion 412-P of optical assembly 412) of optical assembly 500. As shown, image light 492-C, 492-P and 492-P' (collectively and individually referred to herein as image light 492) is received at curved surface 510-1 and goes through folded optical paths including reflection at the reflector 514 and reflection at the beam splitter 512 before being output from curved surface 510-2 (e.g., the optical path of image light 492 includes one or more folds).

FIG. 5B illustrates ambient light 490 transmitted through switchable window 414 and the peripheral portion of optical assembly 500 in an optical path that is different from the optical path of image light 492 by, for example, not including any folds. As shown, ambient light 490 is transmitted through peripheral portions of the beam splitter 512 and the reflector 514 without reflection at the reflector.

FIG. 5C shows the optical paths of image light 492 and ambient light 490 being transmitted to eyebox 480. Display 410 is configured to output image light 492 having a first polarization (e.g., a first circular polarization). When ambient light 490 is transmitted through switchable window 414, ambient light 490 has a second polarization (e.g., second circular polarization). In some embodiments, the first polarization is right-handed circular polarization (RCP) and the second polarization is left-handed circular polarization (LCP), or vice versa.

As shown, optical assembly 500 is configured to receive image light 492 and to focus and output the image light 492 from curved surface 510-2 in a first direction. Optical assembly 500 is also configured to receive ambient light 490 propagating in a second direction at curved surface 510-1 and to output the ambient light 490 from curved surface 510-2 without substantially changing its direction (e.g., direction of ambient light 490 output from optical assembly 500 forming an angle with the second direction that is less than 1 degree). In some embodiments, the first direction and the second direction are about the same and can be perceived by the user as coming from a same location or locations that are close to each other.

Inset A of FIG. 5C illustrates the optical paths of the image light 492 and the ambient light 490 in optical assembly 500 and polarizations of the image light 492 and the ambient light 490 along the optical paths.

Referring to the optical path of the image light 492, curved surface 510-1 is configured to receive image light 492 having the first polarization (e.g., RCP) and transmit the image light 492 toward beam splitter 512. Beam splitter 512 is configured to transmit at least a first portion of the image light 492 toward optical retarder 516. Optical retarder 516 is configured transmit the first portion of the image light 492 toward reflector 514 while converting the first portion of the image light 492 to a third polarization (e.g., a first linear polarization). Reflector 514 is configured to reflect the first portion of image light 492 having the third polarization towards optical retarder 516. Optical retarder 516 is configured to transmit the first portion of the image light 492 toward beam splitter 512 while converting the first portion of the image light 492 from the third polarization to the first polarization. Beam splitter 512 is configured to receive the first portion of image light 492 having the first polarization and reflect a second portion of image light 492 toward optical retarder 516 such that the reflected second portion of image light 492 has the second polarization. Optical retarder 516 is configured to transmit the second portion of image light 492 having the second polarization toward reflector 514 while converting the second portion of image light 492 to a fourth polarization (e.g., a second linear polarization). Reflector 514 is configured to transmit the second portion of image light 492 such that the second portion of image light 492 having the fourth polarization is output from curved surface 510-2 at the first optical power. Due to reflection at beam splitter 512 and reflector 514, each of the radius of curvature of beam splitter 512 and the radius of curvature of reflector 514 contribute to the first optical power.

Referring to the optical path of the ambient light 490, curved surface 510-1 is configured to receive ambient light 490 having the second polarization (e.g., LCP) and to transmit the ambient light 490 toward beam splitter 512. Beam splitter 512 is configured to transmit at least a first portion of ambient light 490 toward optical retarder 516. Optical retarder 516 is configured to transmit the first portion of ambient light 490 toward reflector 514 while converting the first portion of ambient light 490 to the fourth polarization. Reflector 514 is configured to transmit the first portion of ambient light 490 such that the first portion of ambient light 490 having the fourth polarization is output from curved surface 510-2 at the second optical power.

In some embodiments, it may be desirable for optical assembly 500 to include one or more additional substrates that provide an optical path for ambient light that has reduced or insignificant aberrations. The additional substrates may also help maintain diopter requirements for displaying images from display 410 within the user's accommodation range, and allow for customization based on a user's prescription. Descriptions of such optical assemblies are provided below with respect to FIGS. 5D-5I.

Figure 5E:
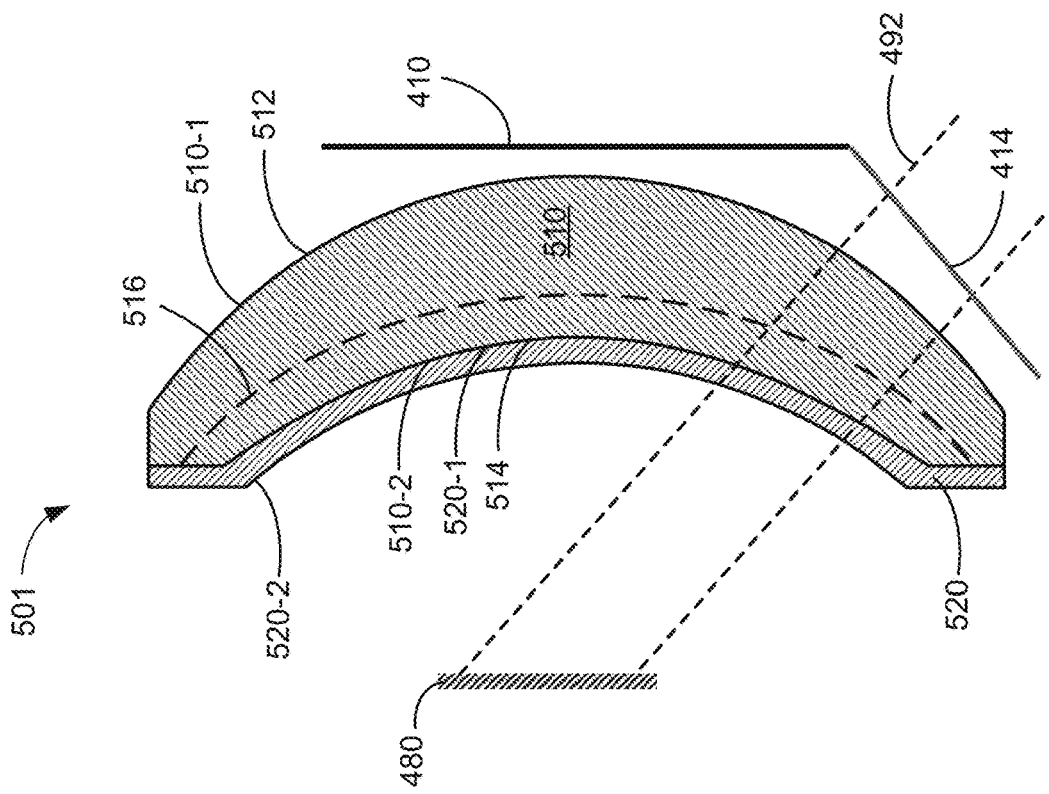
FIGS. 5D-5F are schematic diagrams illustrating an optical assembly including a meniscus lens in accordance with some embodiments.
Figure 5D:
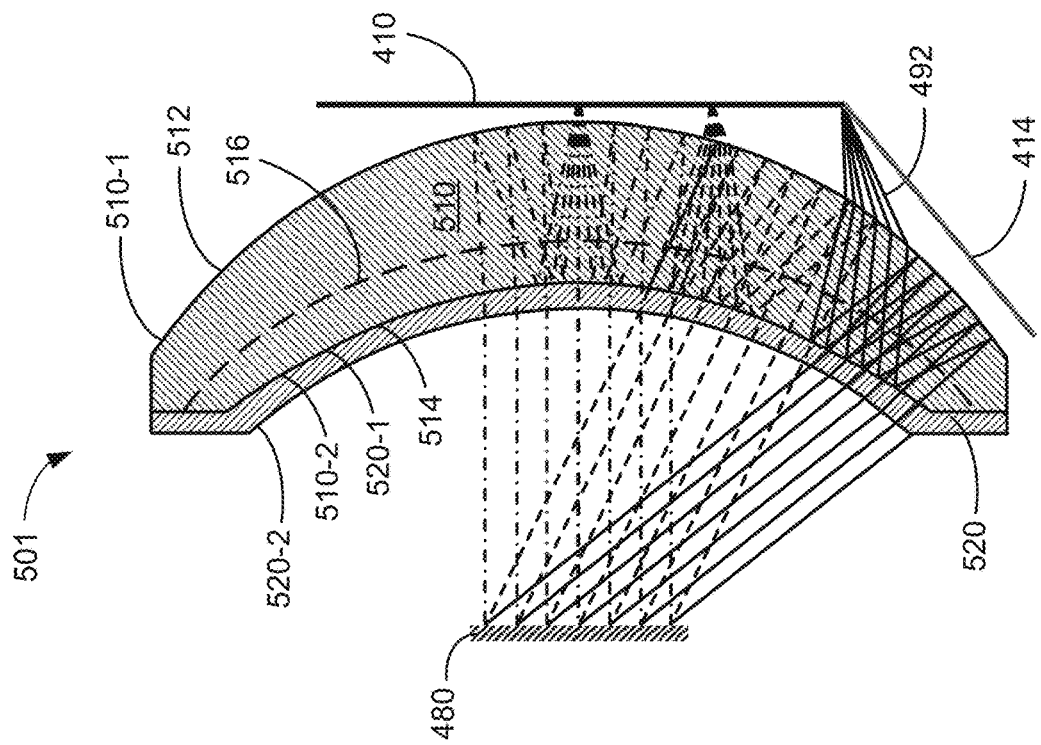
Figure 5F:
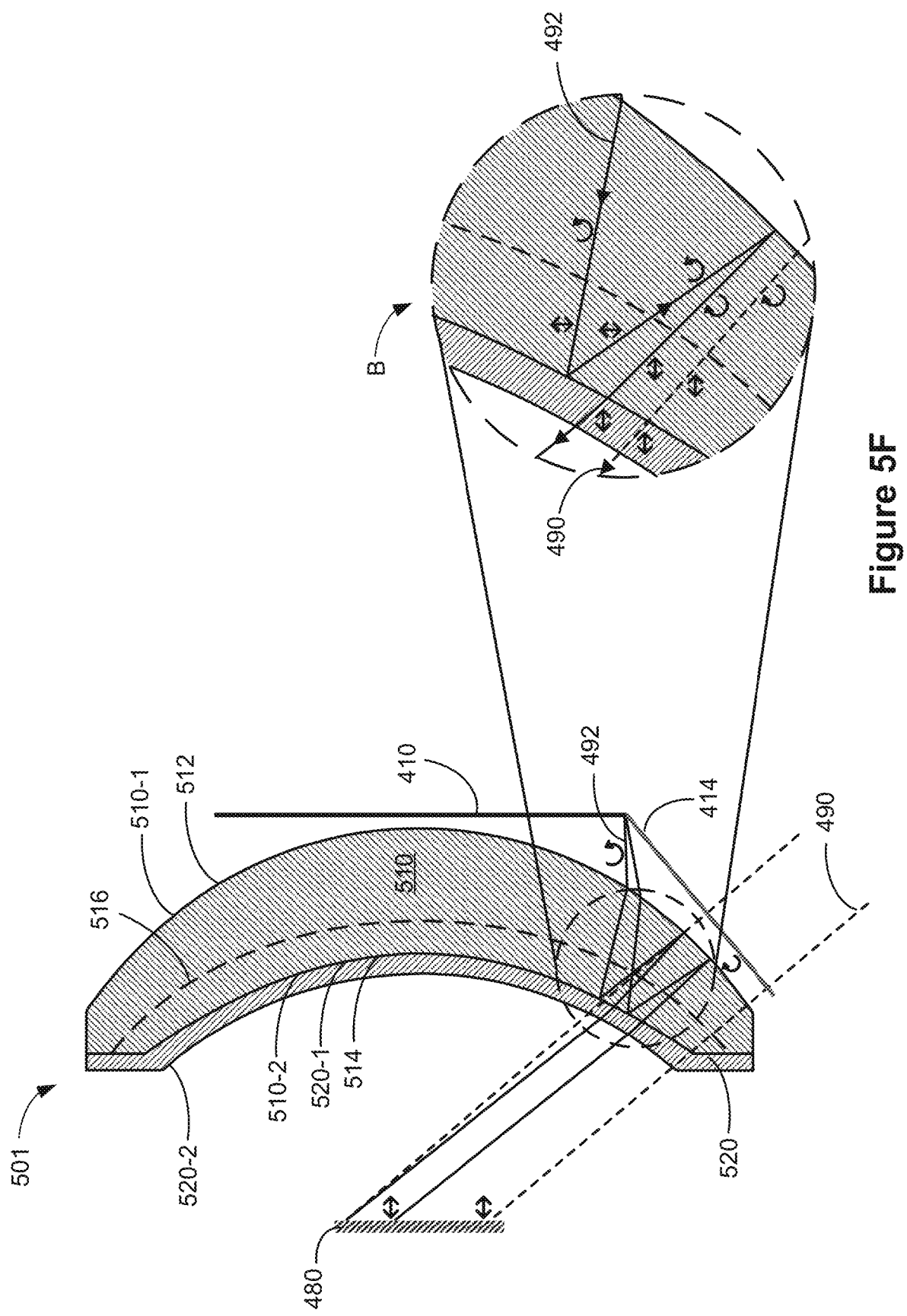

FIGS. 5D-5F are schematic diagrams illustrating optical assembly 501, corresponding to optical assembly 412, in accordance with some embodiments. Optical assembly 501 includes optical assembly 500, details of which are not repeated here for brevity. Optical assembly further includes a substrate 520 that has a curved surface 520-1 and a curved surface 520-2 that is opposite to curved surface 520-1. Curved surface 520-1 conforms with curved surface 510-2 and is coupled to curved surface 510-2. At least a portion of curved surface 520-2 has the first radius of curvature and is substantially parallel to a corresponding portion of curved surface 510-1, such that the see-through power is close to 0. In some embodiments, substrate 520 has a same refractive index as substrate 510.

FIG. 5D illustrates optical paths of image light 492 output from display 410 and transmitted through optical assembly 501. As shown, image light 492 is optically coupled into and transmitted through substrate 520 after transmission through substrate 510.

FIG. 5E illustrates ambient light 490 transmitted through switchable window 414 and a peripheral portion of optical assembly 501. As shown, ambient light 490 is optically coupled into and transmitted through substrate 520 after transmission through substrate 510.

Inset B of FIG. 5F illustrates the optical paths of the image light 492 and the ambient light 490 in detail. Transmission of image light 492 and ambient light 490 through substrate 510 are described above with respect to FIGS. 5A-5C and thus, are not repeated here for brevity.

Referring to the optical path of the image light 492 after being transmitted through substrate 510 and being output from curved surface 510-2, the image light 492 having the fourth polarization is optically coupled into substrate 520 via curved surfaces 510-2 and 520-1, which are coupled to one another. The image light 492 is then output from curved surface 520-2 at the first optical power without change in its polarization.

Referring to the optical path of the ambient light 490 after being transmitted through the peripheral portion of substrate 510 and being output from a peripheral portion of curved surface 510-2, the ambient light 490 having the fourth polarization is optically coupled into a peripheral portion of substrate 520 via curved surfaces 510-2 and 520-1. The ambient light 490 is then output from a peripheral portion of curved surface 520-2 at the second optical power without change in its polarization. Since peripheral portions of curved surfaces 510-1 and 520-2, through which ambient light 490 is transmitted, have the same radius of curvature, the ambient light 490 is transmitted through a peripheral portion of optical assembly 501 with zero or insignificant optical aberrations.

Figure 5H:
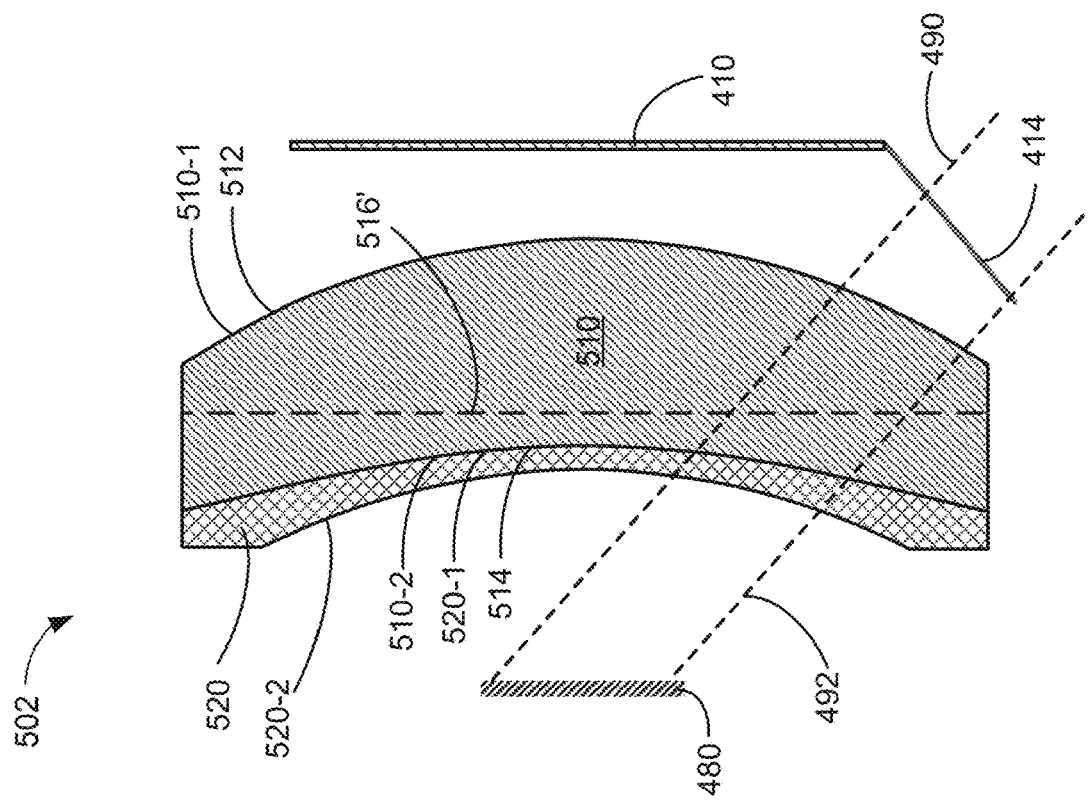
Figure 5G:
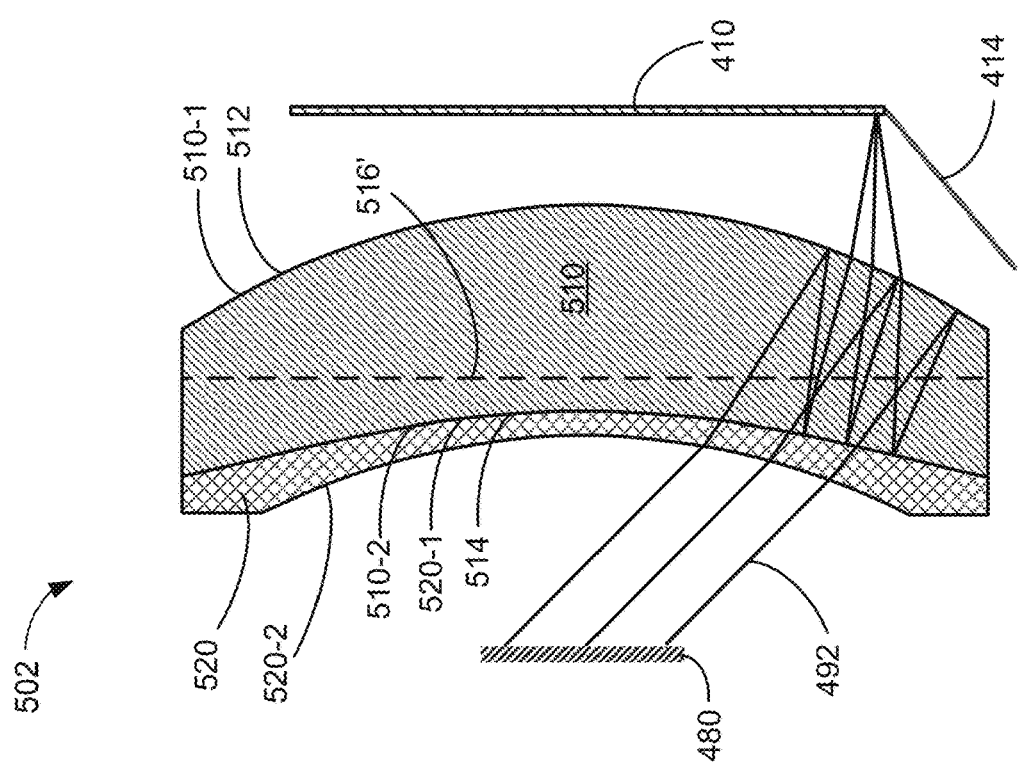
Figure 51:
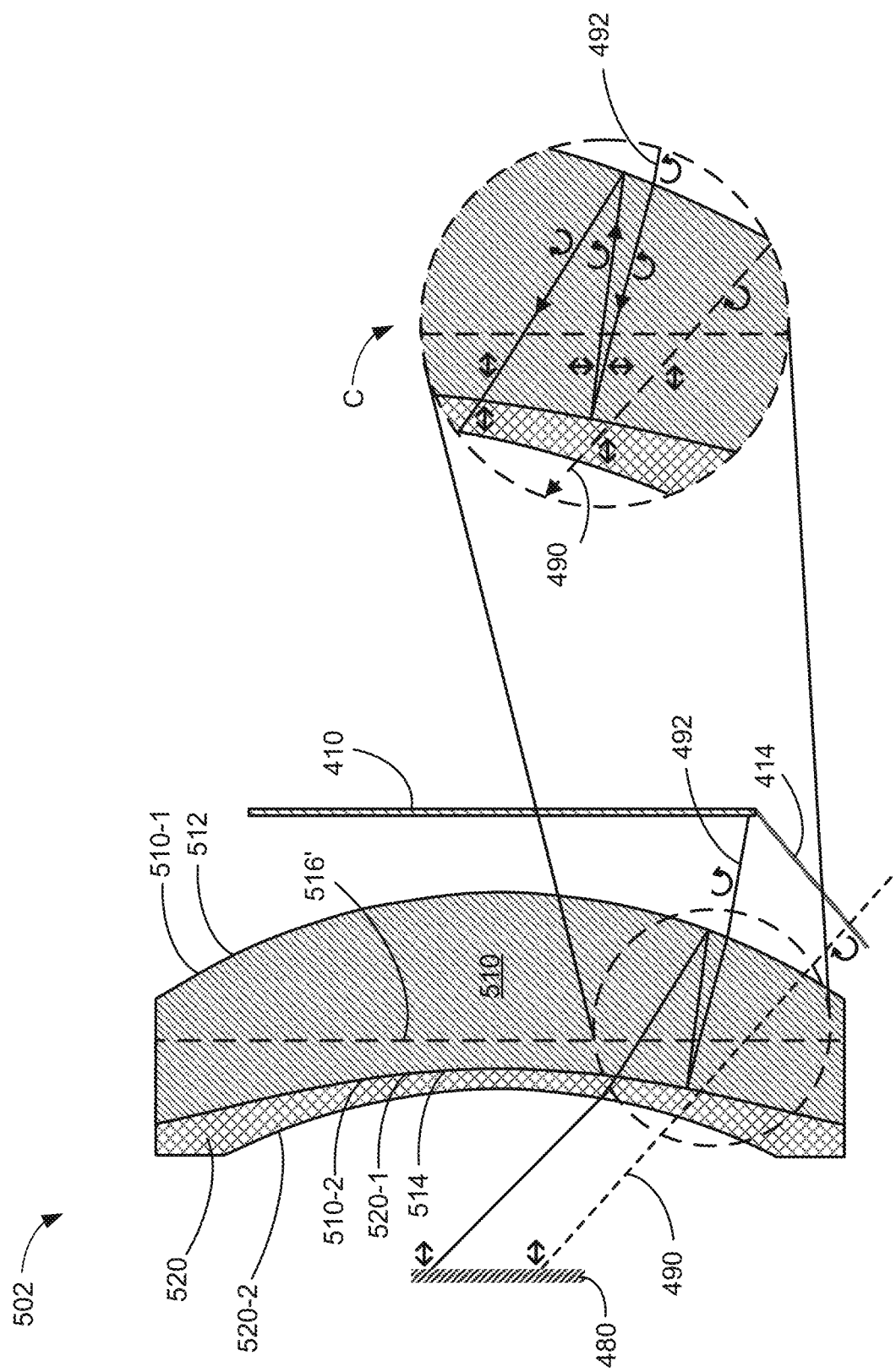

FIGS. 5G-5I are schematic diagrams illustrating optical assembly 502, corresponding to optical assembly 412, in accordance with some embodiments. Optical assembly 502 corresponds to optical assembly 501 with the exception that optical assembly 502 includes optical retarder 516' instead of optical retarder 516. As shown, optical retarder 516' is spaced apart from reflector 514 and has a substantially flat profile (e.g., radius of curvature larger than, for example, 100 meters). As shown, the flat profile of optical retarder 516' does not change the optical paths of image light 492 or ambient light 490 transmitted through optical assembly 502 compared to the optical paths of image light 492 or ambient light 490 transmitted through optical assembly 501. Compared to optical retarder 516 which has a curved profile, optical retarder 516' which has a flat profile is more easily integrated into optical systems for displaying images with high contrast. Additionally, optical assembly 502 may be easier to fabricate compared to optical assembly 501 due to the flat profile of optical retarder 516'.

The optical paths of image light 492 and ambient light 490 are shown in FIGS. 5G and 5H, respectively. Details regarding the optical paths of image light 492 and ambient light 490 are shown inset C of FIG. 5I. As image light 492 and ambient light 490 are transmitted through optical assembly 502 in a same manner as described above with respect to optical assembly 501, details of their respective optical paths are not repeated here for brevity.

In some embodiments, it may be desirable for any of optical assembly 500, 501, and/or 502 to be configured to have high transmittance to ambient light 490 (e.g., transmit greater than 30%, 40%, 50%, 60%, 70%, 80%, 90%, 95%, 97%, 98%, or 99% of ambient light). In such cases, the optical assembly 500, 501, and/or 502 may include one or more optical elements that are narrow band optical elements. For example, the optical assembly 500, 501, and/or 502 may have an average transmittance greater than 30%, 40%, 50%, 60%, 70%, 80%, 90%, 95%, 97%, 98%, or 99% over a visible wavelength range (e.g., between 380 nm and 700 nm) while have a high reflectance (and a corresponding low transmittance), such as 70%, 80%, 90%, 95%, 97%, 98%, or 99% reflectance, for one or more narrow bands (e.g., a full width at half maximum having 20 nm or less, 10 nm or less, 5 nm or less, 3 nm or less, 2 nm or less, or 1 nm or less).

Figure 5K:
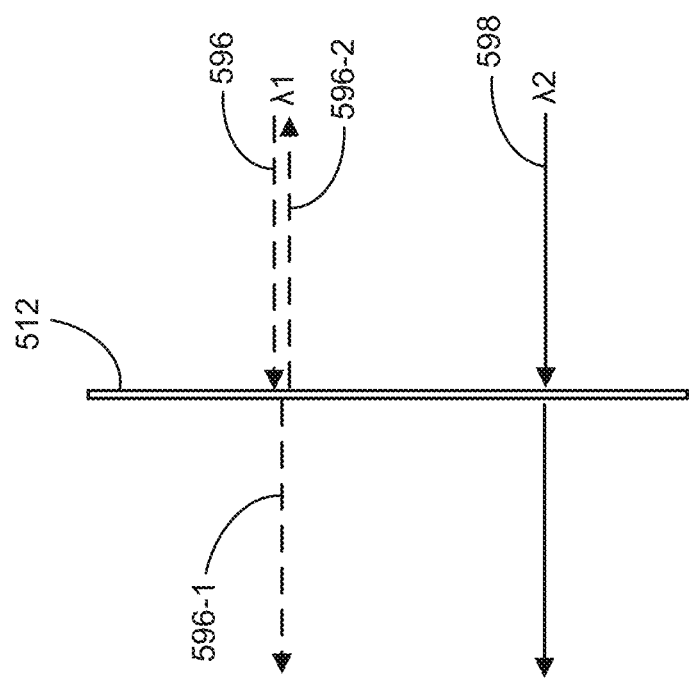
FIG. 5K is schematic diagram illustrating a narrow band beam splitter in accordance with some embodiments.
Figure 5J:
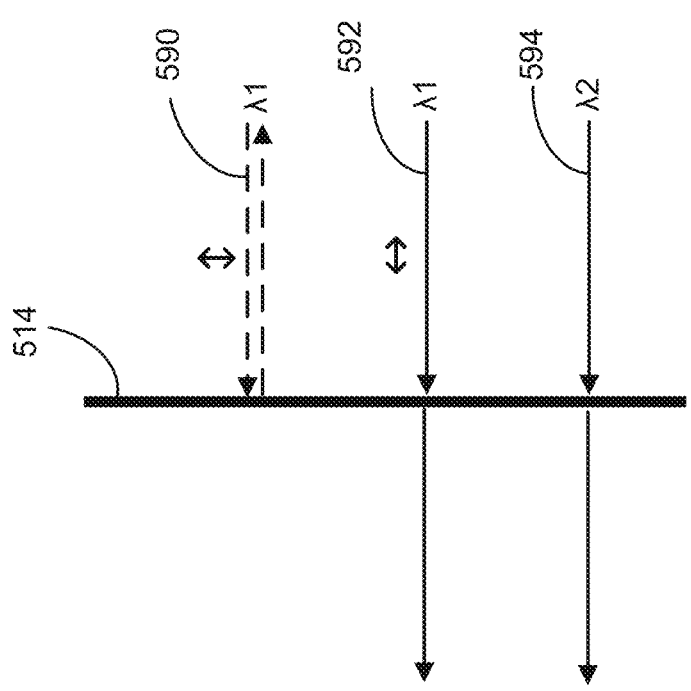
FIG. 5J is schematic diagram illustrating a narrow band reflector in accordance with some embodiments.

FIGS. 5J and 5K illustrate a narrow band reflector and a narrow band beam splitter, respectively, in accordance with some embodiments. In some embodiments, as shown in FIG. 5J, the reflector 514 may be a narrow band reflector (e.g., reflective polarizer) that is configured to (i) reflect light 590 having a first linear polarization and wavelengths $\lambda 1$ in a predetermined wavelength range, (ii) transmit light 592 having the second linear polarization and wavelengths in the predetermined wavelength range and light 594 having wavelengths $\lambda 2$ outside the predetermined wavelength range regardless of polarization. Additionally, when the reflector 514 is a narrow band reflector, the optical assembly 500, 501, and 502 (shown in FIGS. 5A-5I) including the narrow band reflector 514 are capable of directing image light 492 having a narrow band output that corresponds to (e.g., is the same as, or overlaps at least partially with) the predetermined wavelength range while transmitting a substantial portion of ambient light. For example, the image light may include light from narrow band sources such as lasers. Thus, an optical assembly that includes a narrow band reflector 514 is configured to transmit a larger portion (e.g., a larger percentage of a spectral range, or a larger portion of intensity) of the ambient light 490 compared to an optical assembly including a reflector 514 that is not a narrow band reflective polarizer (e.g., is a broad band reflective polarizer). For example, optical assembly 500, 501, and/or 502 that includes a narrow band reflective polarizer may transmit 90%, 95%, 99% or more of the ambient light 490.

In some embodiments, as shown in FIG. 5K, the beam splitter 512 may be a narrow band beam splitter, thereby increasing transmission of the ambient light through any of optical assembly 500, 501, and/or 502. In such cases, the narrow band beam splitter is configured to (i) transmit a first portion 596-1 of light 596 and reflect a second portion 596-2 of the light 596 when the light 596 has a wavelength $\lambda 1$ that is within the predetermined wavelength range (e.g., the narrow band beam splitter operates as a partial reflector, such as a 50:50 mirror, for light within the predetermined wavelength range), and to (ii) transmit light 598 when the light 598 has a wavelength $\lambda 2$ outside the predetermined wavelength range. Thus, an optical assembly that includes a narrow band beam splitter 512 is configured to transmit a larger portion (e.g., a larger percentage of a spectral range, or a larger portion of intensity) of the ambient light 490 compared to an optical assembly including a beam splitter 512 that is not a narrow band beam splitter (e.g., is a broad band beam splitter). For example, optical assembly 500, 501, and/or 502 that includes a narrow band beam splitter may transmit 90%, 95%, 99% or more of the ambient light 490.

Figure 6A:
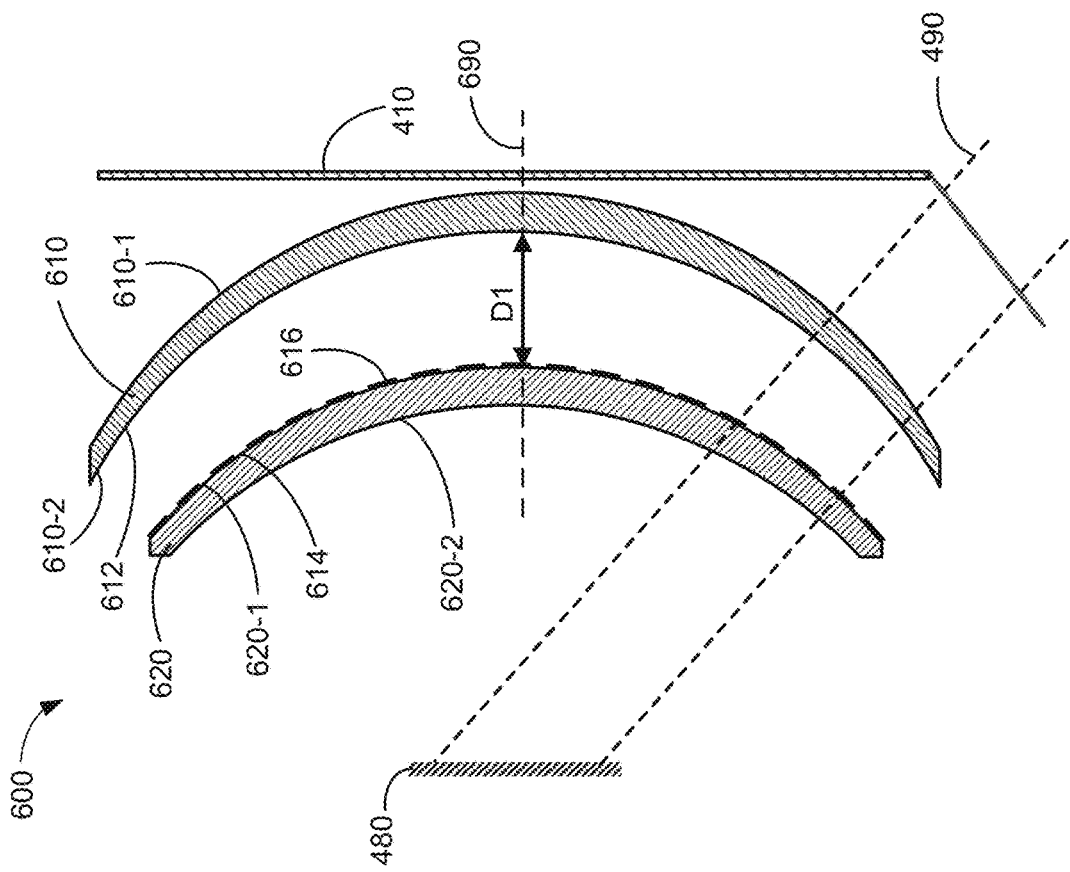
FIGS. 6A-6C are schematic diagrams illustrating an optical assembly including separated meniscus lenses in accordance with some embodiments.
Figure 6B:
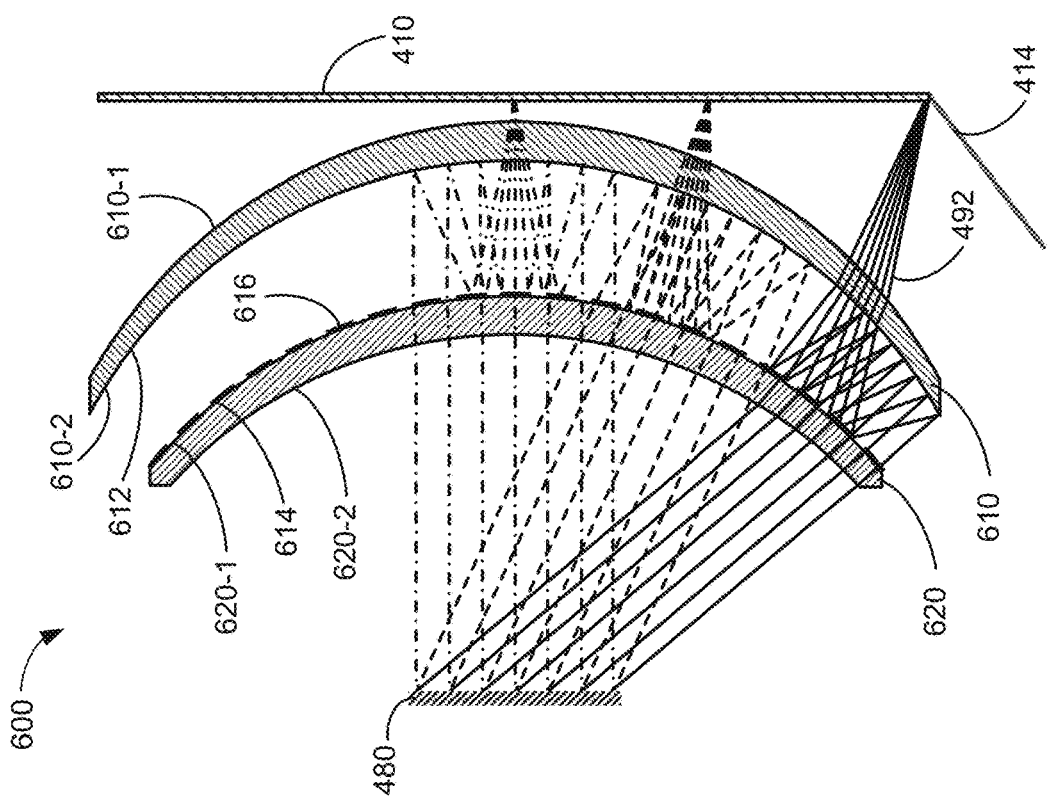
Figure 6C:
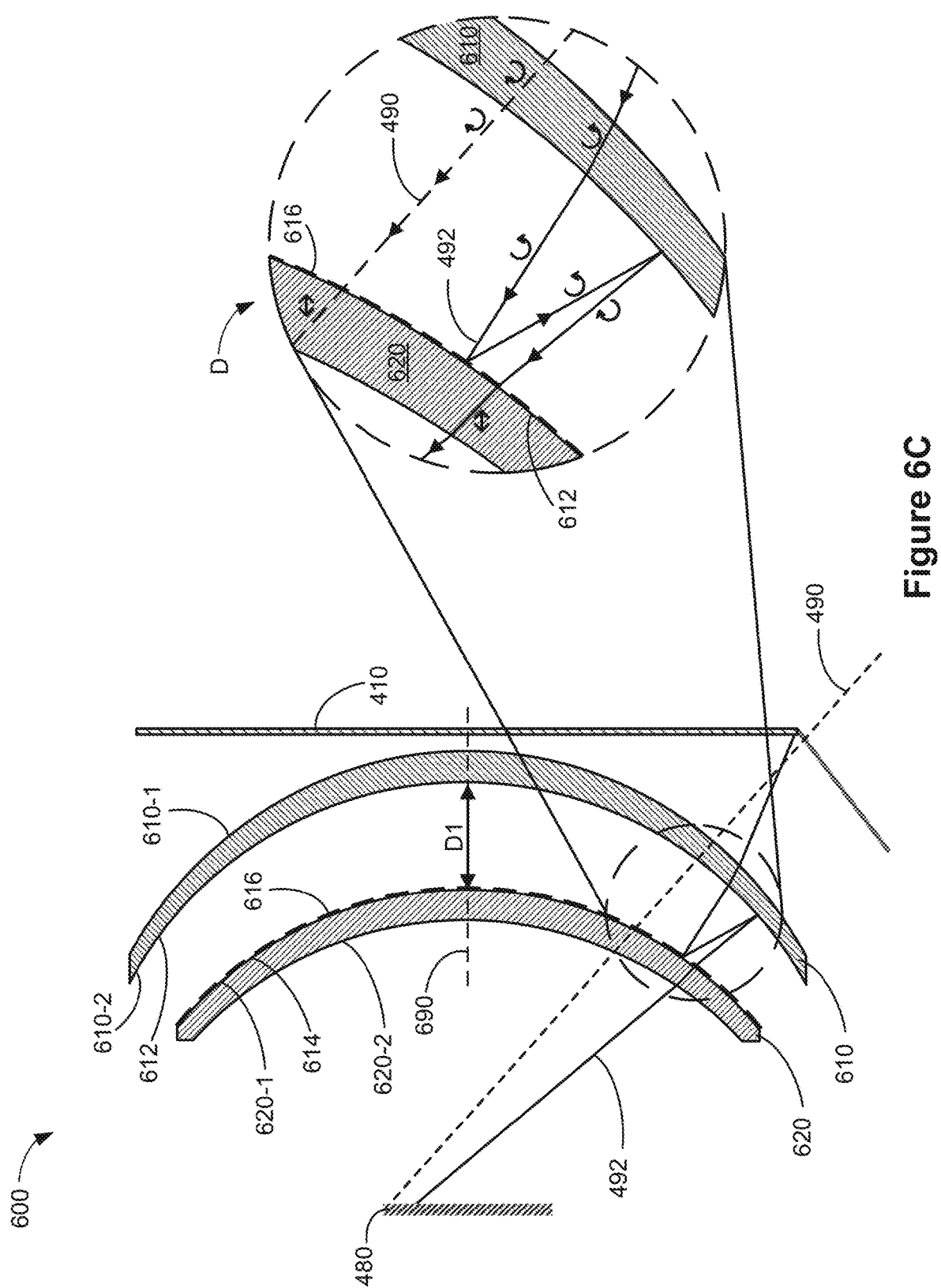

FIGS. 6A-6C are schematic diagrams illustrating optical assembly 600, corresponding to optical assembly 412, in accordance with some embodiments. Optical assembly 600 includes substrates 610 and 620. Substrate 610 provides a surface 610-1 and a curved surface 610-2 opposite to surface 610-1. Substrate 620 provides a curved surface 620-1 and a surface 620-2 opposite to curved surface 620-1. Substrate 610 and substrate 620 are disposed proximate to one another and share a reference axis 690. Curved surface 610-2 is disposed proximate to and spaced apart from curved surface 620-1 by a distance D1 along reference axis 690. The radius of curvature for each of the surfaces (including curved surfaces) 610-1, 610-2, 620-1, and 620-2, are designed to reduce the optical power at which ambient light is transmitted with an ideal case of ambient light being transmitted with zero or negligible optical power. Optical assembly 600 also includes a beam splitter 612 disposed on curved surface 610-2, a reflector 614 (e.g., reflective polarizer) disposed on curved surface 620-1, and an optical retarder 616 (e.g., quarter-wave plate) that is disposed between the beam splitter 612 or the reflector 614. In some embodiments, as shown, optical retarder 616 is an optical coating that is laminated to reflector 614 and has the second radius of curvature. Alternatively, optical retarder 616 may be an optical coating that is laminated to beam splitter 612 and has the first radius of curvature (not shown).

FIG. 6A illustrates the optical paths of image light 492 output from display 410 and transmitted through optical assembly 600. As shown, the image light 492 is received at surface 610-1 and reflected at the reflector 614 and beam splitter 612 before being output from surface 620-2 (e.g., each of the optical paths of the image light 492 includes one or more folds).

FIG. 6B illustrates ambient light 490 transmitted through switchable window 414 and a peripheral portion of optical assembly 600 in an optical path that is different from any of the optical paths of the image light 492. As shown, the ambient light 490 is transmitted through peripheral portions of the beam splitter 612 and the reflector 614 without reflection at the reflector.

As shown, in FIG. 6C, optical assembly 600 is configured to receive image light 492 to focus and output the image light 492 in a first direction. Optical assembly 600 is also configured to receive the ambient light 490 propagating in a second direction and output the ambient light 490 from curved surface 620-2 without substantially changing its direction (e.g., direction of ambient light 490 output from optical assembly 600 forming an angle with the second direction that is less than 1 degree). In some embodiments, the first direction and the second direction are about the same and can be perceived by the user as coming from a same location or locations that are close to each other.

Inset D of FIG. 6C illustrates the optical paths of the image light 492 and the ambient light 490, as well as changes in their polarizations along their respective optical paths.

Referring to the optical path of the image light 492, substrate 610 is configured to receive image light 492 having the first polarization (e.g., RCP) at surface 610-1 and to transmit the image light 492 toward beam splitter 612 disposed on curved surface 610-2. Beam splitter 612 is configured to transmit at least a first portion of the image light 492 toward optical retarder 616 and reflector 614, shown laminated together on curved surface 620-1. Optical retarder 616 is configured to convert the first portion of the image light 492 to a third polarization (e.g., the first linear polarization), and reflector 614 is configured to reflect the first portion of image light 492. Optical retarder 616 is configured to transmit the first portion of the image light 492, reflected from reflector 614, toward beam splitter 612 while converting the first portion of the image light 492 from the third polarization to the first polarization. Beam splitter 612 is configured to receive the first portion of image light 492 having the first polarization and reflect a second portion of image light 492 toward optical retarder 616 and reflector 614 such that the reflected second portion of image light 492 has the second polarization. Optical retarder 616 is configured to convert the second portion of image light 492 from the second polarization to a fourth polarization (e.g., the second linear polarization). Reflector 614 is configured to transmit the second portion of image light 492 such that the second portion of image light 492 having the fourth polarization is transmitted through substrate 620 and output from surface 620-2 at the first optical power. Due to reflection at beam splitter 612 and reflector 614, each of the radius of curvature of beam splitter 612 and the radius of curvature or reflector 614 contribute to the first optical power.

Referring to the optical path of the ambient light 490, surface 610-1 is configured to receive ambient light 490 having the second polarization (e.g., LCP) and to transmit the ambient light 490 toward beam splitter 612. Beam splitter 612 is configured to transmit at least a first portion of ambient light 490 toward optical retarder 616 and reflector 614. Optical retarder 616 is configured to convert the first portion of ambient light 490 to the fourth polarization and reflector 614 is configured to transmit the first portion of ambient light 490 such that the first portion of ambient light 490 having the fourth polarization is transmitted through substrate 620 and output from surface 620-2 at the second optical power.

In some embodiments, optical assembly 600 is configured to have a high transmittance (e.g., transmission greater than 30%, 40%, 50%, 60%, 70%, 80%, 90%, 95%, 97%, 98%, or 99%) for ambient light 490. In such cases, the reflector 614 may be a narrow band reflector (e.g., reflective polarizer). Details regarding a narrow band reflector are provided above with respect to FIG. 5J and thus, are not repeated herein for brevity. In some embodiments, the beam splitter 612 is a narrow band beam splitter. A narrow band beam splitter is described above with respect to FIG. 5K. Thus, such details are not repeated herein for brevity.

Figure 7B:
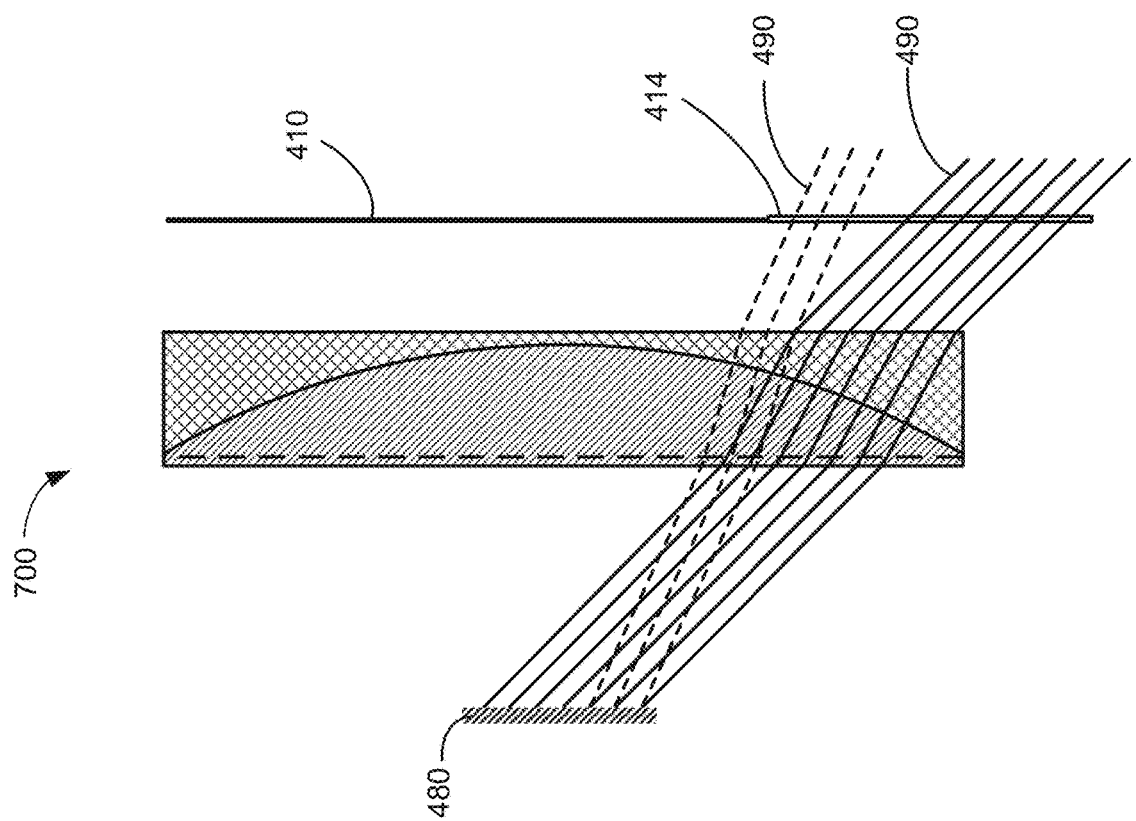
FIGS. 7A-7C are schematic diagrams illustrating an optical assembly in accordance with some embodiments.
Figure 7A:
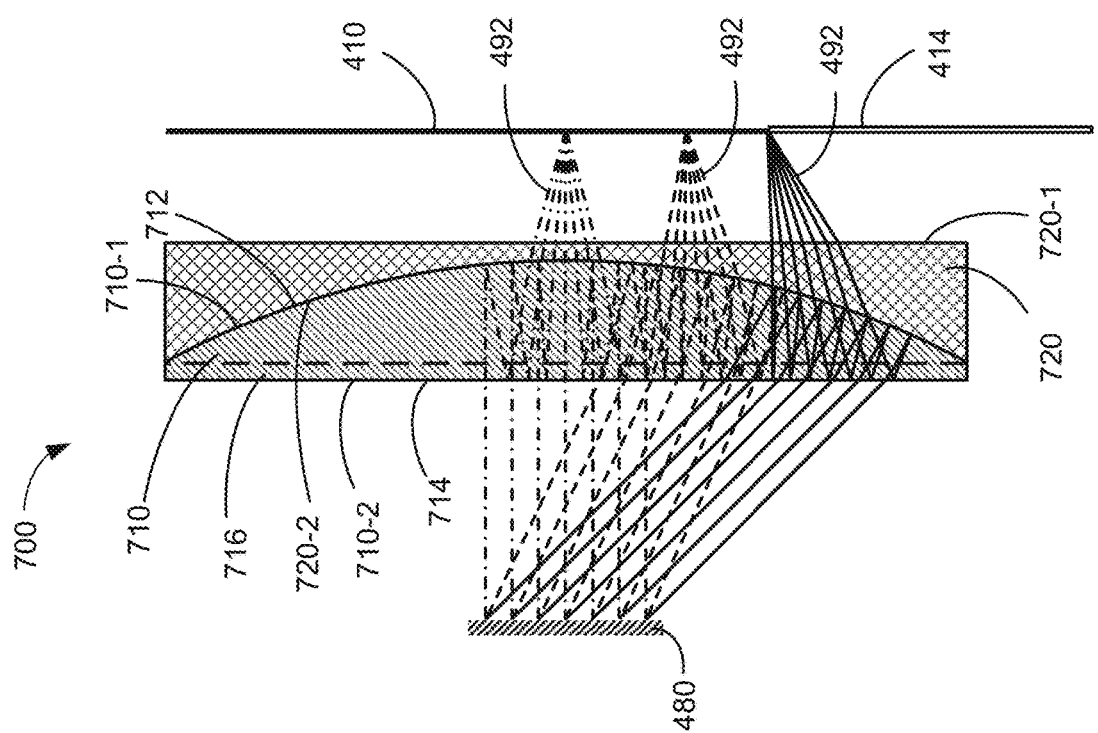
Figure 7C:
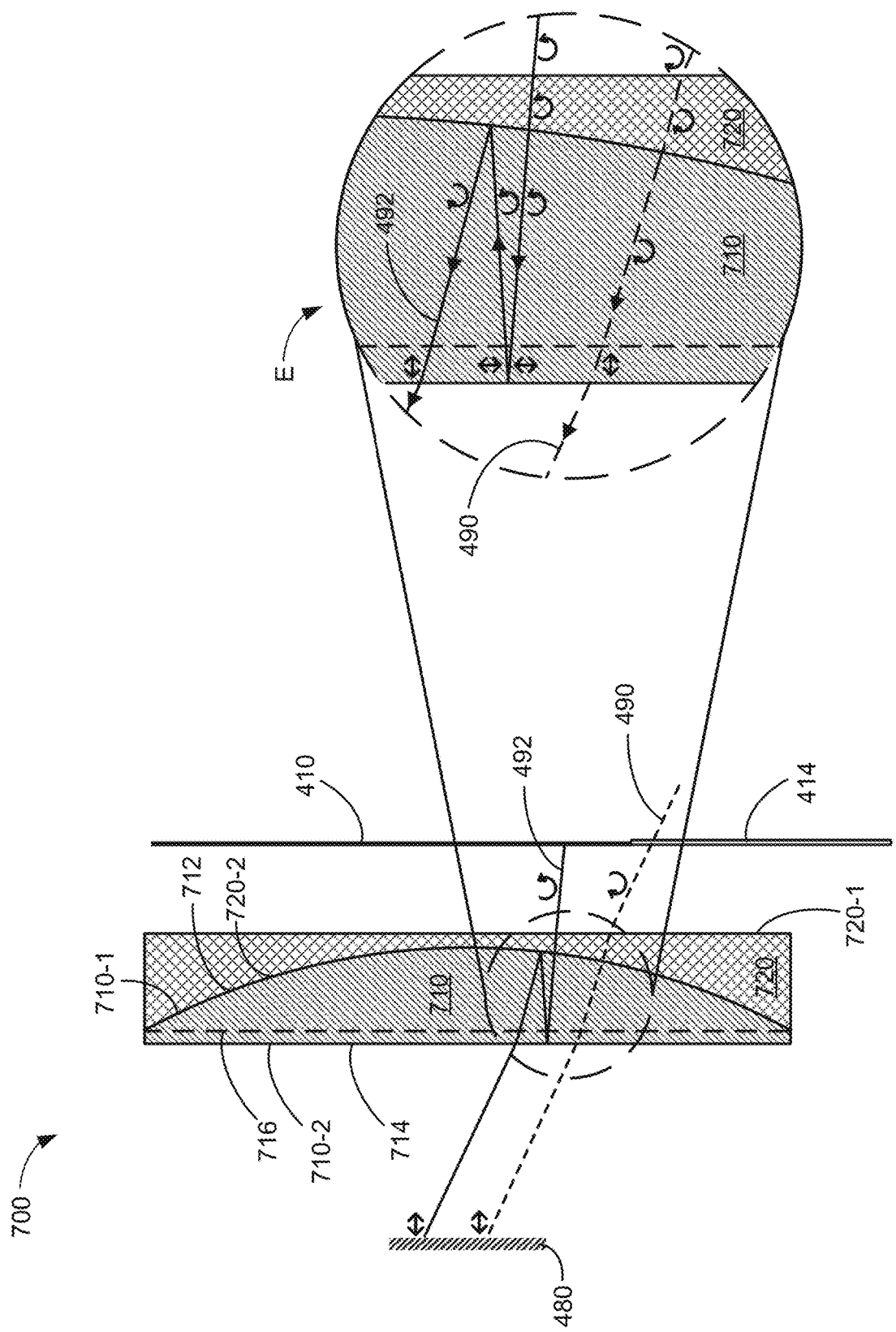

FIGS. 7A-7C are schematic diagrams illustrating optical assembly 700, corresponding to optical assembly 412, in accordance with some embodiments. Optical assembly 700 includes a substrate 710 that provides a curved surface 710-1 and a surface 710-2 opposite to curved surface 710-1. At least a portion of curved surface 710-1 has a first radius of curvature and surface 710-2 is flat. Optical assembly 700 also includes a beam splitter 712 disposed on curved surface 710-1, a reflector 714 (e.g., reflective polarizer) disposed on surface 710-2, and an optical retarder 716 (e.g., quarter-wave plate) that is disposed between beam splitter 712 and reflector 714. In some embodiments, optical retarder 716 is flat and may be spaced apart from reflector 714 and/or beam splitter 712. Alternatively, optical retarder 716 may be an optical coating that is laminated to reflector 714 or beam splitter 712, in which case optical retarder 716 would have either a flat surface profile or the first radius of curvature, respectively. Optical assembly 700 also includes a substrate 720 that has a surface 720-1 and a surface 720-2 that is opposite to the surface 720-1. At least a portion of surface 720-2 has the first radius of curvature and is coupled to curved surface 710-1. Surface 720-1 is flat and substantially parallel (e.g., forming an angle less than 1 degree) with surface 710-2.

FIG. 7A illustrates optical paths of image light 492 output from display 410 and transmitted through optical assembly 700. As shown, the image light 492 is received at surface 720-1 and reflected at the reflector 714 and beam splitter 712 before being output from surface 710-2 (e.g., each of the optical paths of the image light 492 includes one or more folds).

FIG. 7B illustrates optical paths of ambient light 490 transmitted through switchable window 414 and the peripheral portion of optical assembly 700. As shown, the ambient light 490 is transmitted through peripheral portions of the beam splitter 712 and the reflector 714 without reflection at the reflector (e.g., the optical paths of the ambient light 490 do not include any folds).

As shown, in FIG. 7C, optical assembly 700 is configured to receive image light 492 to focus and output the image light 492 in a first direction. Optical assembly 700 is also configured to receive the ambient light 490 propagating in a second direction and output the ambient light 490 from surface 710-2 without substantially changing its direction (e.g., direction of ambient light 490 output from optical assembly 700 forming an angle with the second direction that is less than 1 degree). In some embodiments, the first direction and the second direction are about the same and can be perceived by the user as coming from a same location or locations that are close to each other.

Inset E of FIG. 7C illustrates the optical paths of the image light 492 and the ambient light 490 and their respective polarizations along the optical paths.

Referring to the optical path of the image light 492, substrate 720 is configured to receive the image light 492 having the first polarization (e.g., RCP) at surface 720-1 and to transmit the image light 492 toward surface 720-2, which is coupled to curved surface 710-1. Since beam splitter 712 is disposed on the curved surface 710-1, at least a first portion of the image light 492 is transmitted through beam splitter 712 toward optical retarder 716. Optical retarder 716 is configured transmit the first portion of the image light 492 toward reflector 714 while converting the first portion of the image light 492 to the third polarization (e.g., the first linear polarization). Reflector 714 is configured to reflect the first portion of image light 492 toward optical retarder 716. Optical retarder 716 is configured to transmit the first portion of the image light 492, reflected from reflector 714, toward beam splitter 712 while converting the first portion of the image light 492 from the third polarization to the first polarization. Beam splitter 712 is configured to receive the first portion of image light 492 having the first polarization and reflect a second portion of image light 492 toward optical retarder 716 such that the reflected second portion of image light 492 has the second polarization. Optical retarder 716 is configured to transmit the second portion of image light 492 toward reflector 714 while converting the second portion of image light 492 from the second polarization to a fourth polarization (e.g., the second linear polarization). Reflector 714 is configured to transmit the second portion of image light 492 such that the second portion of image light 492 having the fourth polarization is output from surface 710-2 at the first optical power. Due to reflection at beam splitter 712, the radius of curvature of beam splitter 712 contributes to the first optical power.

Referring to the optical path of the ambient light 490, surface 720-1 is configured to receive ambient light 490 having the second polarization (e.g., LCP) and to transmit the ambient light 490 toward beam splitter 712. Beam splitter 712 is configured to transmit at least a first portion of ambient light 490 toward optical retarder 716. Optical retarder 716 is configured to transmit the first portion of ambient light 490 toward reflector 714 while converting the first portion of ambient light 490 to the fourth polarization. Reflector 714 is configured to transmit the first portion of ambient light 490 such that the first portion of ambient light 490 having the fourth polarization is output from surface 710-2 at the second optical power.

In some embodiments, it may be desirable to include an additional substrate or field lens disposed between display 410 and substrates 710 and 720 in order to reduce optical aberrations when transmitting image light 492 and/or ambient light 490. Descriptions of such optical assemblies are provided below with respect to FIGS. 7D-7L.

Figure 7E:
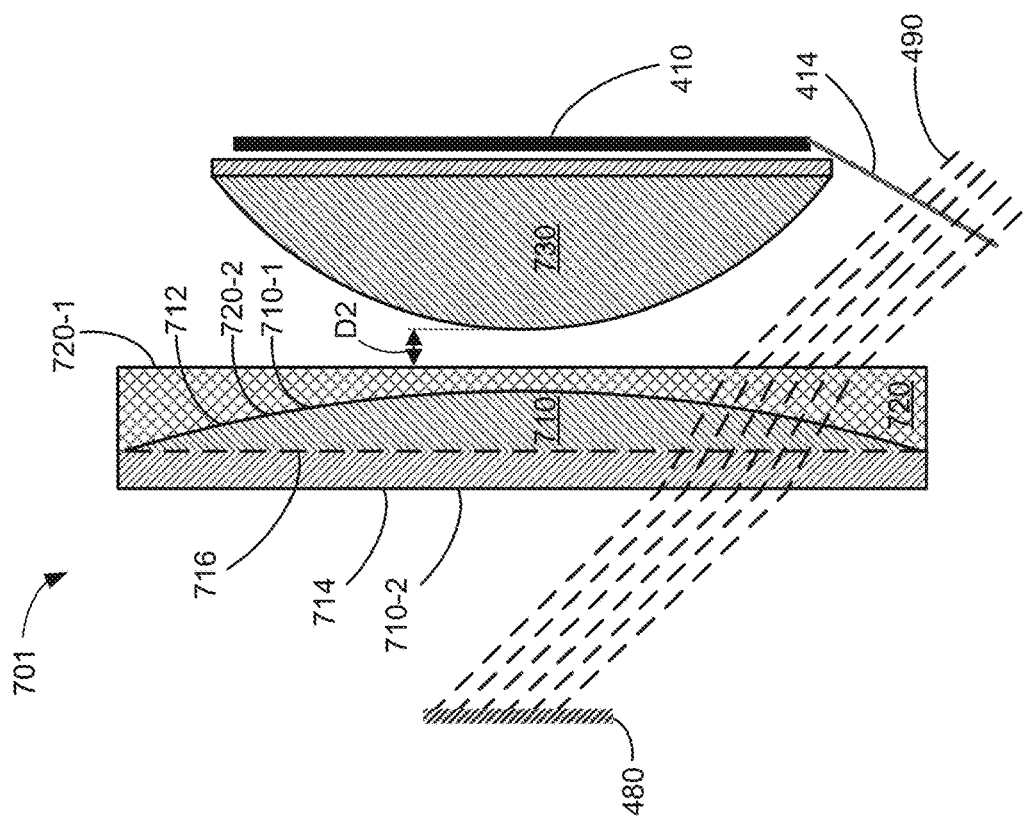
FIGS. 7D-7F are schematic diagrams illustrating an optical assembly including a field lens in accordance with some embodiments.
Figure 7D:
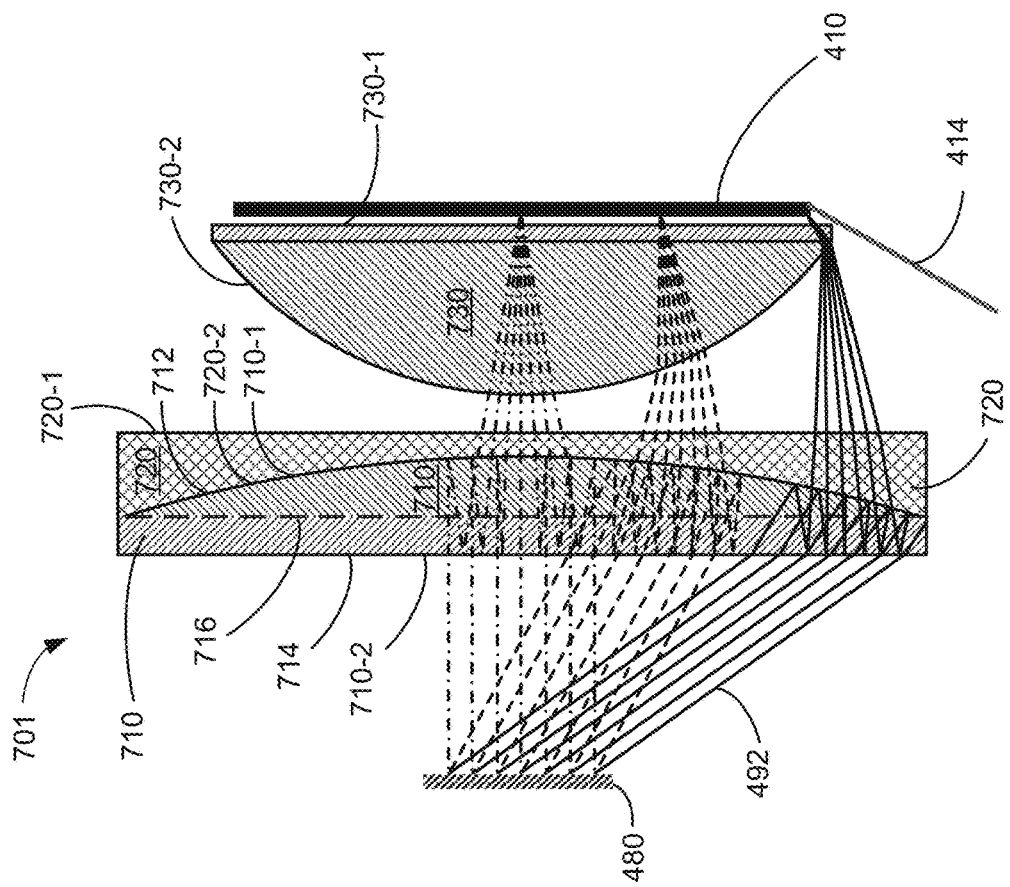
Figure 7F:
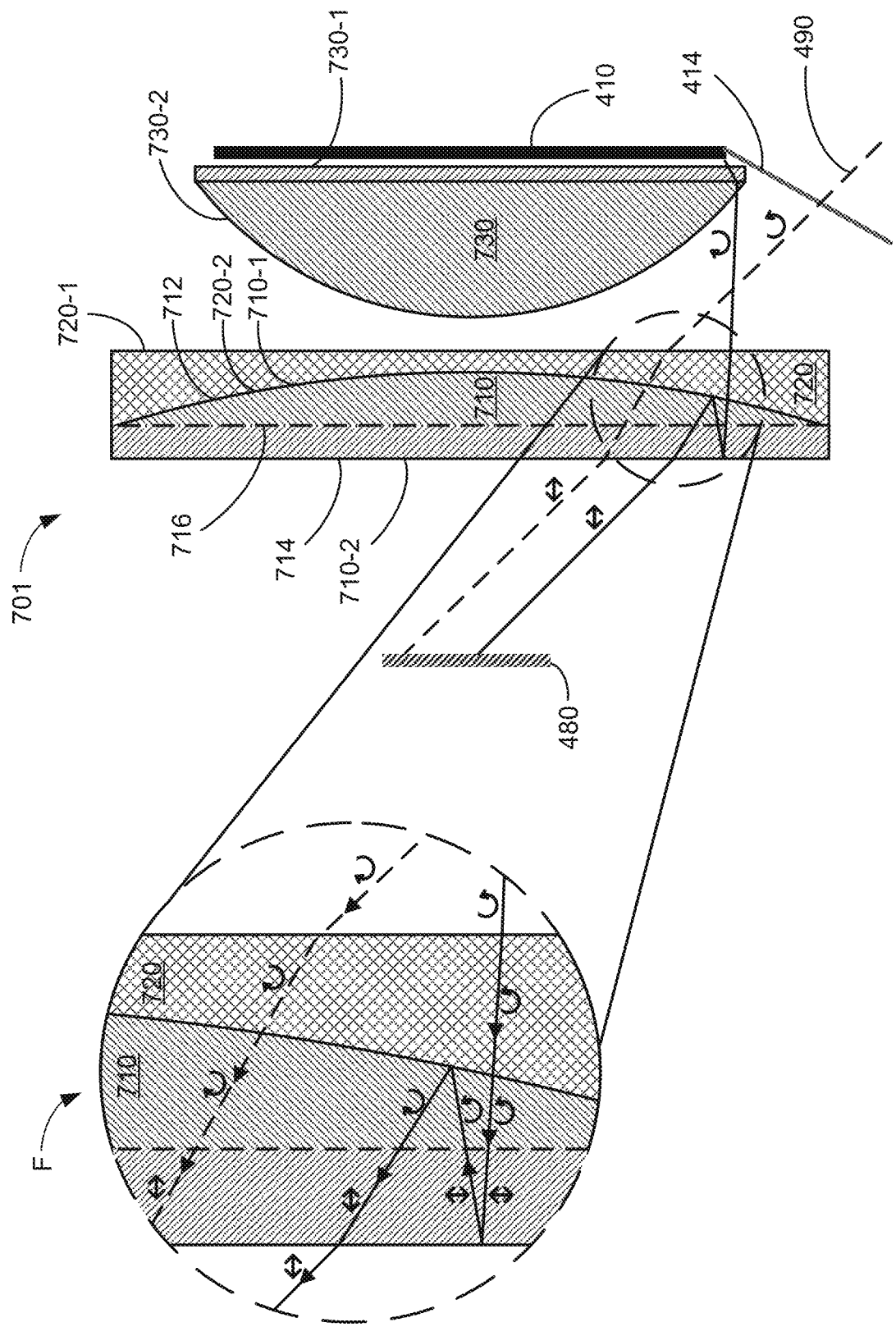

FIGS. 7D-7F are schematic diagrams illustrating optical assembly 701, corresponding to optical assembly 412, in accordance with some embodiments. Optical assembly 701 includes optical assembly 700, details of which are not repeated here for brevity. Optical assembly 701 further includes field lens 730 that has a surface 730-1 and a surface 730-2 opposite to surface 730-1. As shown, surface 730-1 is flat, substantially parallel (e.g., forming an angle less than 1 degree) to surface 710-2, and disposed proximate to and spaced apart from a surface of display 410. Surface 730-2 is disposed proximate to and spaced apart from surface 720-1 by at least a distance D2. In some embodiments, as shown, surface 730-2 is a convex surface and has a radius of curvature that is less than the first radius of curvature.

FIG. 7D illustrates optical paths of image light 492 output from display 410 and transmitted through substrates 710 and 720. As shown, the image light 492 is transmitted through field lens 730 before being transmitting through substrates 710 and 720.

FIG. 7E illustrates ambient light 490 transmitted through switchable window 414 and peripheral portions of substrates 710 and 720 without transmission through field lens 730.

FIG. 7F and Inset F illustrate the optical paths of image light 492 and ambient light 490 and their respective polarizations along their respective optical paths. Transmission of image light 492 and ambient light 490 through substrates 710 and 720 are described above with respect to FIGS. 7A-7C and are not repeated here for brevity.

Referring to the optical path of the image light 492 prior to being transmitted through substrates 710 and 720, image light 492 is output from display 410 and is received at surface 730-1 in a first direction. Due to the radius of curvature of surface 730-2, image light 492 is output from surface 730-2 in a second direction that is different from the first direction. The image light 492, propagating in the second direction, is received at surface 730-1 and is transmitted through substrates 710 and 720, as described above, such that the image light 492 is output from surface 710-2 at the first optical power and in a third direction that is different from each of the first direction and the second direction.

The optical path of ambient light 490 transmitted through optical assembly 701 is the similar to the optical path of ambient light 490 transmitted through optical assembly 700 and is not repeated here for brevity.

Figure 7H:
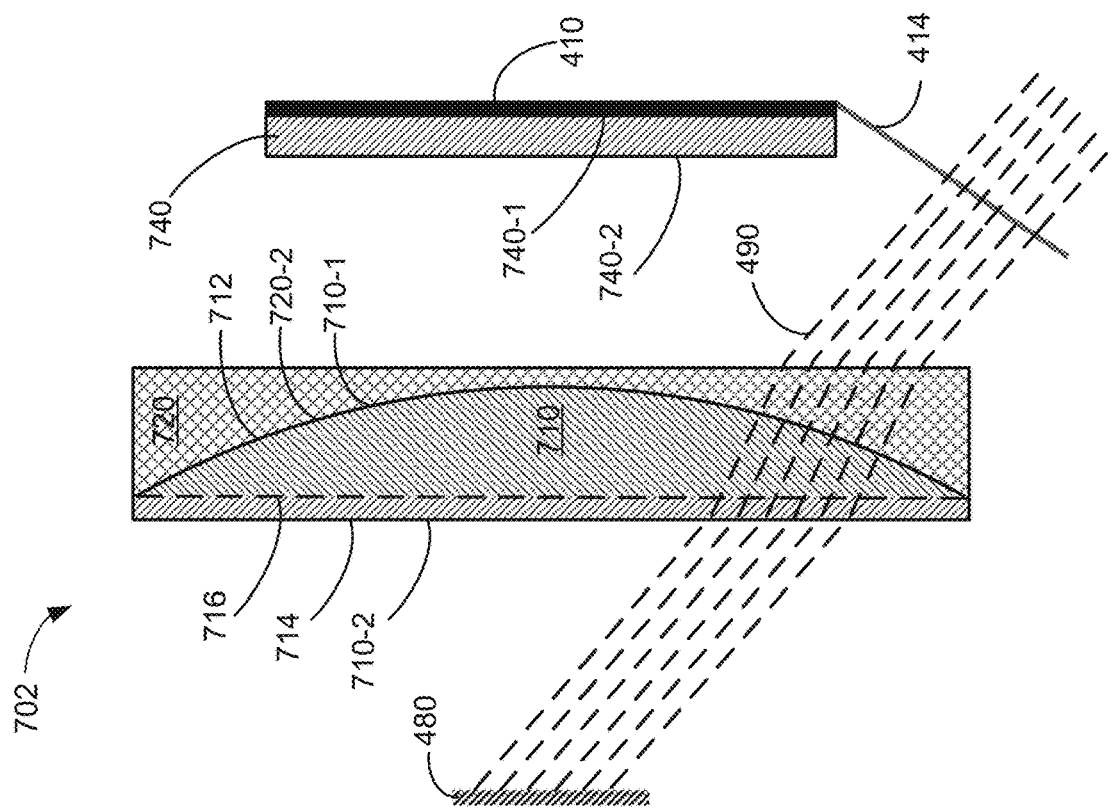
FIGS. 7G-7I are schematic diagrams illustrating an optical assembly including a Fresnel field lens in accordance with some embodiments.
Figure 7G:
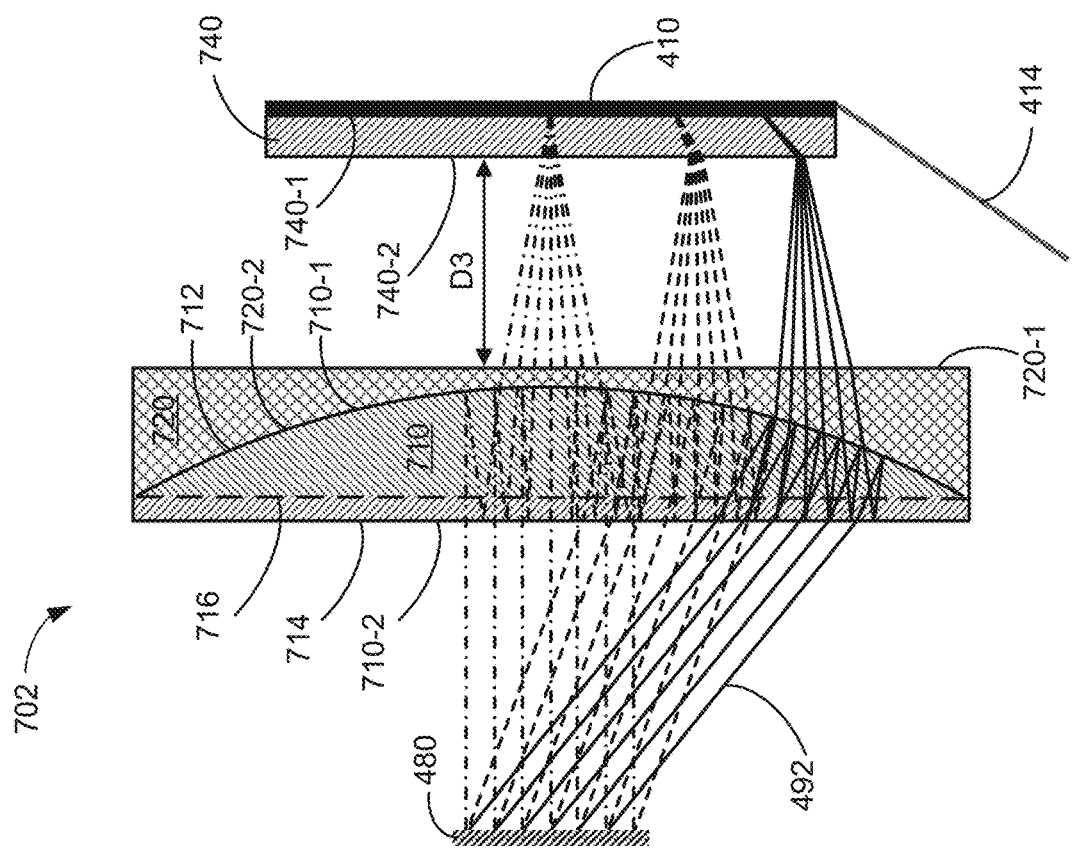
Figure 7I:
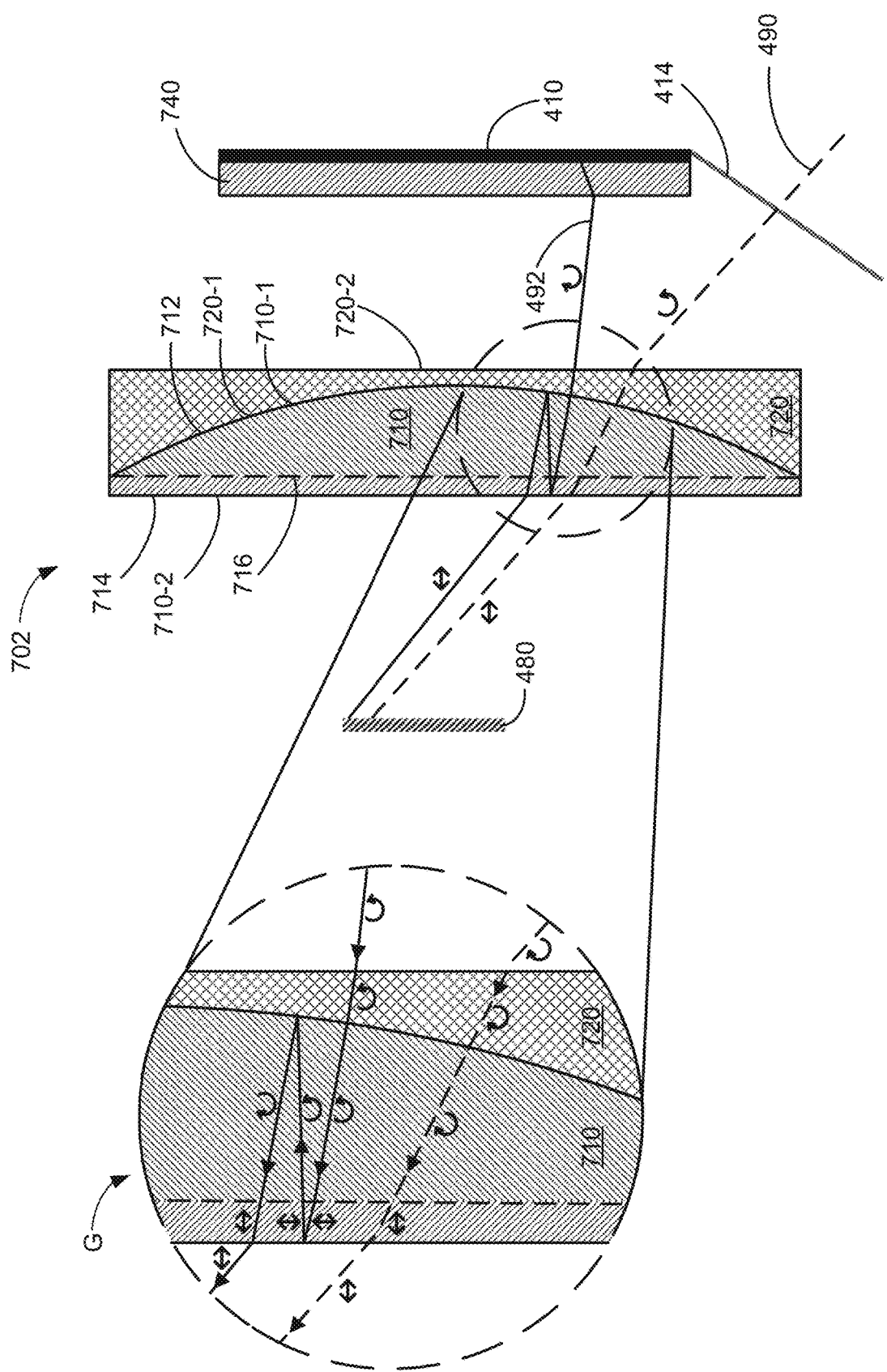

FIGS. 7G-7I are schematic diagrams illustrating optical assembly 702, corresponding to optical assembly 412, in accordance with some embodiments. Optical assembly 702 includes optical assembly 700, details of which are not repeated here for brevity. Optical assembly 702 also includes field lens 740 that has a surface 740-1 and a surface 740-2 opposite to surface 740-1. Field lens 740 includes a plurality of Fresnel surfaces (not shown), configured to redirect image light received from display 410. In some embodiments, as shown, surfaces 740-1 and 740-2 are flat and substantially parallel (e.g., forming an angle less than 1 degree) to surfaces 710-2 and 720-1. In some embodiments, as shown, surface 740-1 is disposed proximate to a surface of display 410 and surface 740-2 is disposed proximate to and spaced apart from surface 720-1 by at least a distance D3.

FIG. 7G illustrates optical paths of image light 492 output from display 410 and transmitted through substrates 710 and 720. As shown, image light 492 is transmitted through field lens 740 before being transmitting through substrates 710 and 720.

FIG. 7H illustrates ambient light 490 transmitted through switchable window 414 and peripheral portions of substrates 710 and 720 without transmission through field lens 740.

FIG. 7I and inset G illustrate optical paths of the image light 492 and the ambient light 490 and their respective polarization long their respective optical paths. Transmission of image light 492 and ambient light 490 through substrates 710 and 720 are described above with respect to FIGS. 7A-7C and are not repeated here for brevity.

Referring to the optical path of the image light 492 prior to being transmitted through substrates 710 and 720, image light 492 is output from display 410 in a first direction. The image light 492 is received at surface 740-1 and transmitted to surface 740-2. Due to the plurality of Fresnel structures in field lens 740, the image light 492 is output from surface 740-2 of field lens 740 in a second direction that is different from the first direction. The image light 492, propagating in the second direction, is received at surface 730-1 and is transmitted through substrates 710 and 720, as described above, such that the image light 492 is output from surface 710-2 at the first optical power and in a third direction that is different from each of the first direction and the second direction.

The optical path of the ambient light 490 transmitted through optical assembly 702 is the same as the optical path of ambient light 490 transmitted through optical assembly 700 and is not repeated here for brevity.

Figure 7K:
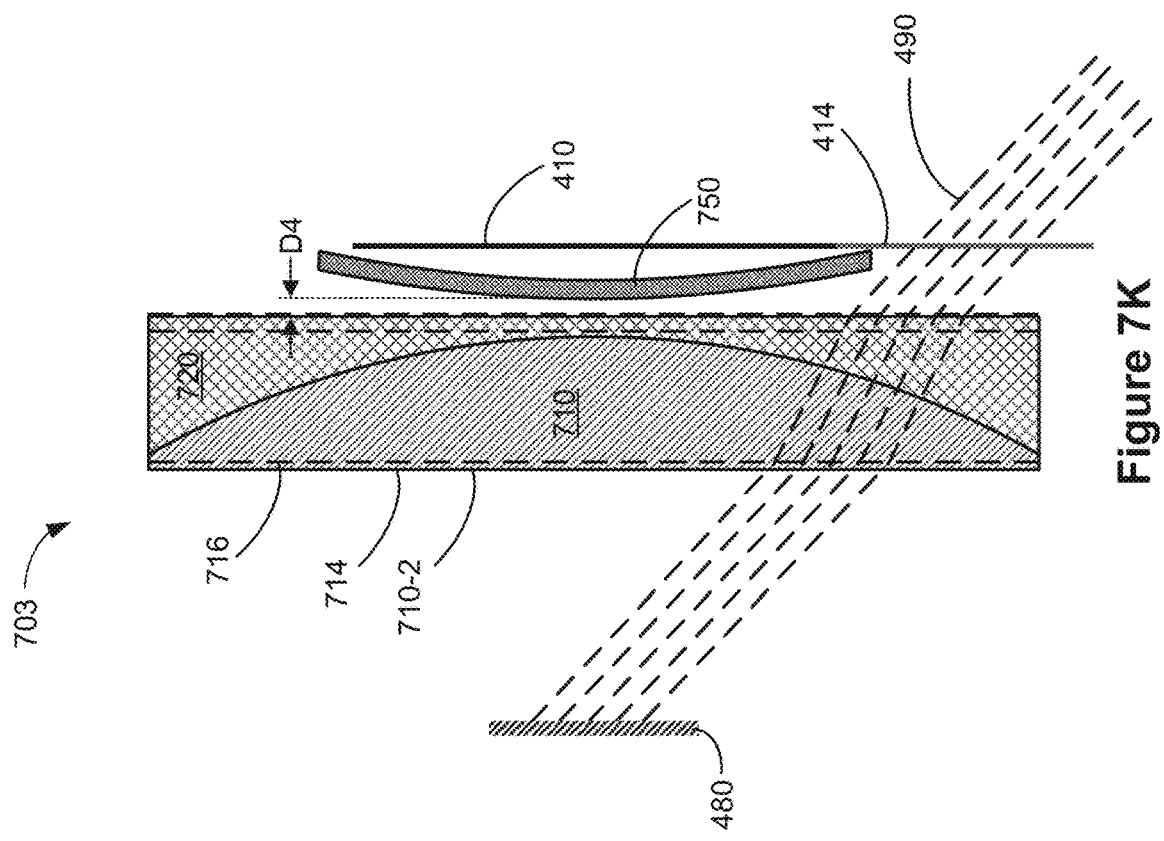
FIGS. 7J-7L are schematic diagrams illustrating an optical assembly in accordance with some embodiments.
Figure 7J:
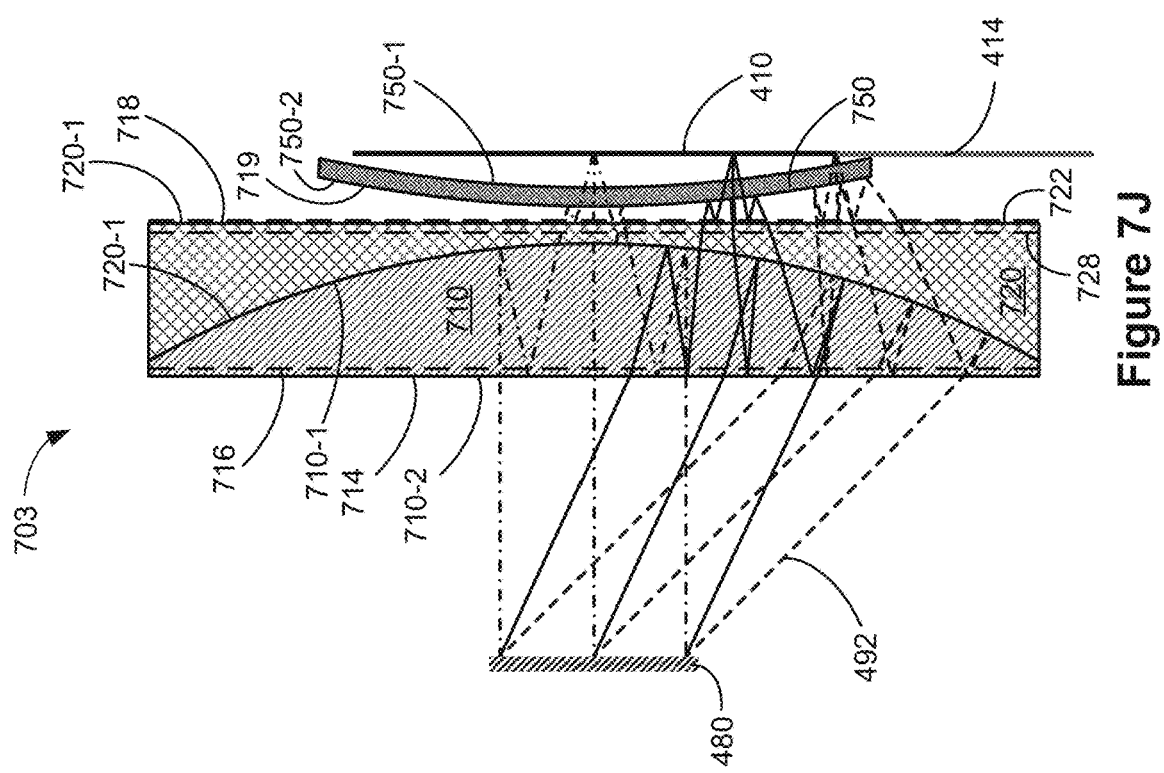
Figure 7L:
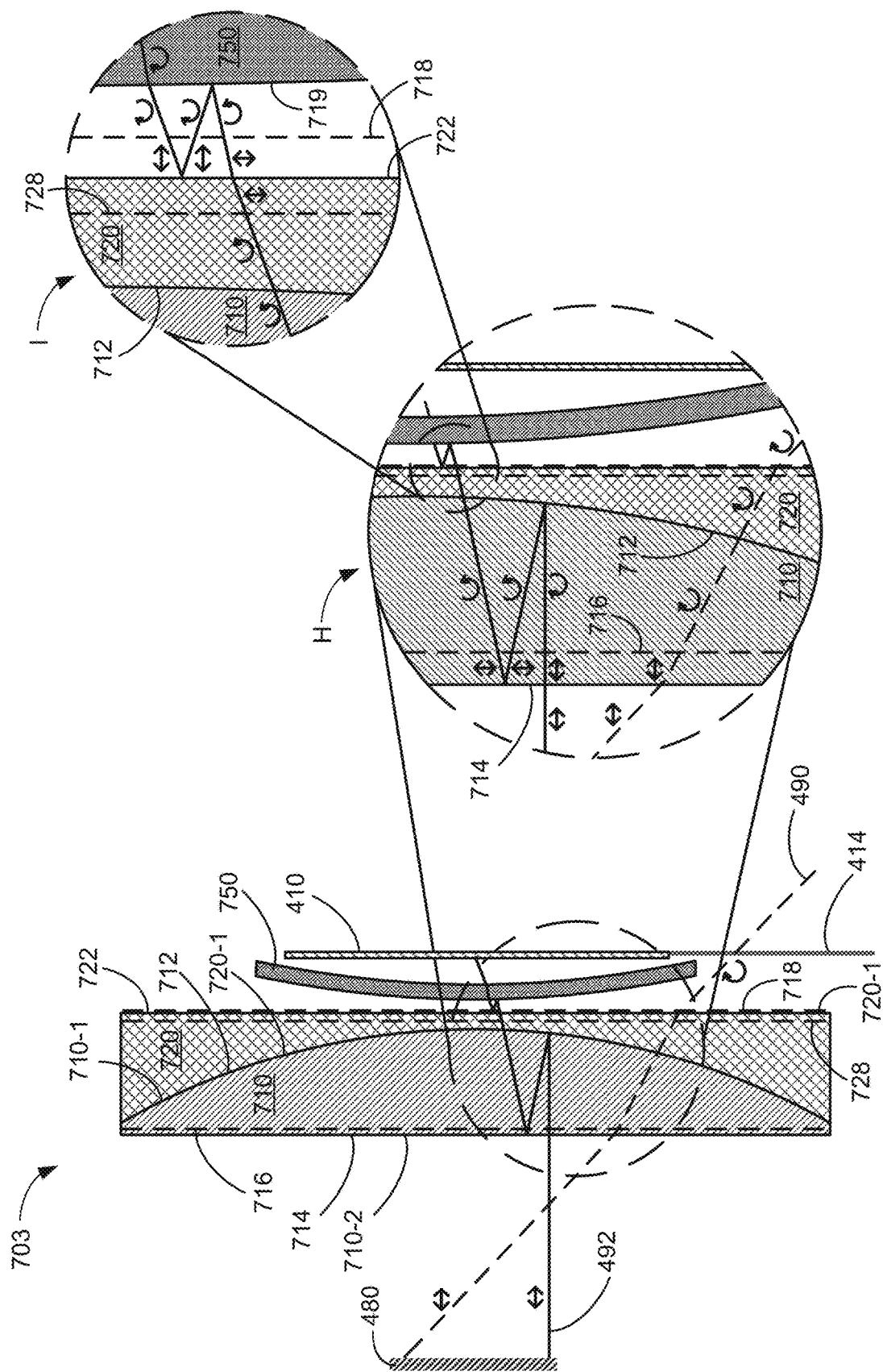

FIGS. 7J-7L are schematic diagrams illustrating optical assembly 703, corresponding to optical assembly 412, in accordance with some embodiments. Optical assembly 703 includes optical assembly 700, details of which are not repeated here for brevity. In addition to the details described above with respect to optical assembly 700, optical assembly 703 also includes reflector 722 and optical retarders 718 and 728. Reflector 722 is disposed on surface 720-1 and in some cases, may be an optical coating laminated to surface 720-1. Optical retarders 718 and 728 are disposed on either side of surface 720-1. Optical retarder 718 may be disposed on either surface 720-1 (shown) or surface 750-2 (not shown). When optical retarder 718 is disposed on surface 750-2, optical retarder 718 may be an optical coating that is laminated to beam splitter 719. When optical retarder 718 is disposed on surface 720-1, optical retarder 718 may be an optical coating that is laminated to surface 720-1. In some embodiments, as shown, optical retarder 728 is disposed between and spaced apart from surface 720-1 and curved surface 710-1. In some embodiments, not shown, optical retarder 728 may be disposed on surface 720-1.

Optical assembly 704 also includes substrate 750 that has a surface 750-1 and a surface 750-2 opposite to surface 750-1, and a beam splitter 719 that is disposed on surface 750-2. In some embodiments, as shown, surfaces 750-1 and 750-2 are curved surface with a same radius of curvature and thus are substantially parallel (e.g., forming an angle less than 1 degree) with one another. In some embodiments, as shown, surface 750-1 is disposed proximate to and spaced apart from a surface of display 410 and surface 750-2 is disposed proximate to and spaced apart from surface 720-1 by at least a distance D4.

FIG. 7J illustrates image light 492 output from display 410 and transmitted through central and peripheral portions of substrates 710 and 720 in a first optical path. As shown, image light 492 is transmitted through substrate 750 before being transmitting through substrates 710 and 720.

FIG. 7K illustrates ambient light 490 transmitted through switchable window 414 and peripheral portions of substrates 710 and 720 without transmission through substrate 750.

FIG. 7L and insets H and I illustrate the optical paths of image light 492 and ambient light 490 and their respective polarizations along their respective optical paths.

Referring to the optical path of image light 492, image light 492 having the second polarization (e.g., LCP) is output from display 410. Image light 492 is received at surface 750-1 and transmitted towards surface 750-2. As shown in inset I, beam splitter 719, which is disposed on surface 740-2, is configured to transmit at least a first portion of image light 492 such that the first portion of image light 492 is output from surface 750-2 toward surface 720-1 without change in its polarization. Optical retarder 718 (shown spaced apart from surface 720-1 for ease of illustration) is configured to transmit the first portion of image light 492 toward surface 720-1 while converting the first portion of image light 492 to the fourth polarization (e.g., the second linear polarization). Reflector 722, disposed on surface 720-1, is configured to reflect the image light 492 back toward surface 750-2 without a change in polarization. Optical retarder 718 is configured to transmit the image light 492 toward surface 750-1 while converting the image light 492 to the second polarization. Beam splitter 719, disposed on surface 750-2, is configured to reflect at least a second portion of image light 492 having the first polarization (e.g., RCP) toward surface 720-1. Optical retarder 718 is configured to transmit the second portion of image light 492 toward surface 720-1 while converting the second portion of image light 492 to the third polarization (e.g., a first linear polarization. Reflector 722, disposed on surface 720-1, is configured to transmit the second portion of image light 492 having the third polarization toward optical retarder 728. Optical retarder 728 is configured to transmit the second portion of image light 492 toward curved surface 710-1 while converting the second portion of image light 492 to the first polarization. Beam splitter 712, disposed on curved surface 710-1, is configured to transmit at least a third portion of image light 492 toward optical retarder 716.

As shown in inset H, optical retarder 716 is configured to transmit the third portion of image light 492 toward surface 710-2 while converting the third portion of image light 492 to the third polarization. Reflector 714, disposed on curved surface 710-2, is configured to reflect the third portion of image light 492 towards optical retarder 716. Optical retarder 716 is configured to transmit the third portion of image light 492 toward beam splitter 712 while converting the third portion of image light 492 from the third polarization to the first polarization. Beam splitter 712, disposed on curved surface 710-1, is configured to receive the third portion of image light 492 having the first polarization and reflect a fourth portion of image light 492 toward optical retarder 716 such that the reflected fourth portion of image light 492 has the second polarization. Optical retarder 716 is configured to transmit the fourth portion of image light 492 having the second polarization toward reflector 714 while converting the fourth portion of image light 492 to the fourth polarization. Reflector 714 is configured to transmit the fourth portion of image light 492 such that the fourth portion of image light 492 having the fourth polarization is output from surface 710-2 at the first optical power. Due to reflection at beam splitters 712 and 719, each of the radius of curvature of curved surface 710-1 and the radius of curvature of surface 750-2 contribute to the first optical power.

The optical path of the ambient light 490 transmitted through optical assembly 702 is the same as the optical path of ambient light 490 transmitted through optical assembly 700 and is not repeated here for brevity.

In some embodiments, it may be desirable for any of optical assemblies 700, 701, 702, and/or 703 to be configured have a high transmittance (e.g., transmission greater than 30%, 40%, 50%, 60%, 70%, 80%, 90%, 95%, 97%, 98%, or 99%) to ambient light 490. In such cases, any of the reflectors 714 and/or 722 may be a narrow band reflector (e.g., reflective polarizer). Details regarding a narrow band reflector are provided above with respect to FIG. 5J and thus, are not repeated herein for brevity. In some embodiments, any of the beam splitters 712 and/or 719 is a narrow band beam splitter as described above with respect to FIG. 5K. Thus, details regarding a narrow band beam splitter are not repeated herein for brevity.

FIG. 8 is a flowchart illustrating a method 800 of transmitting light through an optical assembly (e.g., optical assembly 412, 500-502, 600, 700-703) in accordance with some embodiments. Method 800 includes (step 810) transmitting image light 492 by (step 812) receiving the image light 492 at a beam splitter (e.g., beam splitter 512, 612, 712) on a first curved surface (e.g., surfaces 510-1, 610-2, 710-1) provided by a first substrate (e.g., substrate 510, 610, 620, 710). At least a portion of the first curved surface has a first radius of curvature. Transmitting the image light 492 also includes (step 814) reflecting the image light at a reflector (e.g., reflector 514, 614, 714) disposed on a second surface (e.g., surfaces 510-2, 620-1, 720-2) that is provided by the first substrate or a second substrate (e.g., substrate 620). At least a portion of the second surface has a second radius of curvature that is different from the first radius of curvature. Transmitting the image light 492 further includes (step 816) reflecting the image light 492 at the beam splitter and (step 818) outputting the image light 492 from the reflector at a first non-zero optical power. Method 800 also includes (step 820) transmitting ambient light 490 through a peripheral portion (e.g., corresponding to peripheral portion 412-P of optical assembly 412) of the optical assembly at a second optical power that is less than the first optical power. Transmitting the ambient light 490 includes (step 822) receiving the ambient light 490 at a peripheral portion of the first curved surface, and (step 824) transmitting the ambient light 490 through a peripheral portion of the reflector without reflection at the reflector.

In light of these principles, we now turn to embodiments of an optical assembly in a display device.

In accordance with some embodiments, an optical assembly (e.g., optical assembly 412, 500-502, 600, 700-703) includes at least one substrate (e.g., substrate 510, 610, 620, 710) that provides a first curved surface (e.g., surfaces 510-1, 610-2, 710-1) and a second surface (e.g., surfaces 510-2, 620-1, 720-2). At least a portion of the first curved surface has a first radius of curvature and the second surface has a second radius of curvature that is different from the first radius of curvature. The optical assembly also includes a beam splitter (e.g., beam splitter 512, 612, 712) on the first curved surface, a reflector (e.g., reflector 514, 614, 714) on the second surface, and an optical retarder (e.g., optical retarder 516, 516', 616, 716) disposed between the beam splitter and the reflector. The optical assembly is configured to receive first light (e.g., image light 492) at the first curved surface and reflect the first light at the reflector and subsequently, at the beam splitter before outputting the first light from the reflector. The first light is transmitted through the optical assembly at a first optical power. The optical assembly is also configured to transmit second light (e.g., ambient light 490) at a second optical power that is less than the first optical power. The second light is transmitted through peripheral portions (e.g., corresponding to peripheral portion 412-P of optical assembly 412) of the beam splitter and reflector without reflection at the reflector.

In some embodiments, the at least one substrate includes a first substrate (e.g., substrate 510, 710) and the first curved surface (e.g., surfaces 510-1, 710-1) and the second surface (e.g., surfaces 510-2, 720-2) are opposing surfaces of the first substrate. In embodiments, the second radius of curvature is smaller than the first radius of curvature. In some embodiments, the first light (e.g., image light 492) and the second light (e.g., ambient light 490) are received at the first curved surface and output from the second surface.

In some embodiments, the first optical retarder has a third radius of curvature. In some embodiments, the third radius of curvature is different from each of the first radius of curvature and the second radius of curvature. In some embodiments, the third radius of curvature is the same as one or more of the first radius of curvature and the second radius of curvature.

In some embodiments, the at least one substrate further includes a second substrate (e.g., substrate 520) having a third surface (e.g., surface 520-1) and a fourth surface (e.g., surface 520-2) that is opposite to the third surface. The third surface has the second radius of curvature and is coupled to the second surface (e.g., surface 510-2). At least a portion of the fourth surface has the first radius of curvature and is substantially parallel to the first curved surface (e.g., surface 510-1).

In some embodiments, the first optical retarder (e.g., optical retarder 516') is flat (e.g., the third radius of curvature is infinity.

In some embodiments, the at least one substrate includes a third substrate (e.g., substrate 610) providing the first curved surface (e.g., curved surface 610-2) and a fourth substrate (e.g., substrate 620) providing the second surface (e.g., surface 620-1). The optical retarder (e.g., optical retarder 616) is on the second surface. The third substrate is disposed proximate to and spaced apart from the fourth substrate by distance D1.

In some embodiments, the at least one substrate includes a fifth substrate (e.g., substrate 710) and a sixth substrate (e.g., substrate 720). The first curved surface (e.g., curved surface 710-1) and the second surface (e.g., surface 710-2) are opposing surfaces of the fifth substrate. The second surface is flat. The sixth substrate has a fifth surface (e.g., surface 720-1) and a sixth surface (e.g., surface 720-2) opposite the fifth surface. The fifth surface has the first radius of curvature and is coupled to the first curved surface. The sixth surface is substantially parallel (e.g., forms an angle less than 1 degree) with the second surface (e.g., the sixth surface is flat). In some embodiments, the optical retarder (e.g., optical retarder 716) is flat.

In some embodiments, the optical assembly (e.g., optical assembly 701, 702) further includes a field lens (e.g., field lens 730, 740) having a seventh surface (e.g., surface 730-1, 740-1) and an eighth surface (e.g., surface 730-2, 740-2) opposite to the seventh surface. The seventh surface is a flat surface that is substantially parallel (e.g., forms an angle less than 1 degree) to each of the second surface and the sixth surface. The eighth surface has a fourth radius of curvature and is spaced apart from the sixth surface (e.g., surface 720-1) by at least distance D2 or distance D3.

In some embodiments, the field lens (e.g., field lens 740) includes a plurality of Fresnel structures.

In some embodiments, the sixth surface includes (e.g., surface 720-1) a second optical retarder (e.g. optical retarder 718) and the at least one substrate further includes a seventh substrate (e.g., substrate 750) having a ninth surface (e.g., surface 750-1) and a tenth surface (e.g., surface 750-2) opposite to and substantially parallel with the ninth surface. The tenth surface includes a second beam splitter (e.g., beam splitter 719). The ninth and tenth surface each have a fifth radius of curvature and the tenth surface is spaced apart from the sixth surface (e.g., surface 720-1) by at least distance D4.

In accordance with some embodiments, a display device (e.g., display device 400) includes a window (e.g., switchable window 414) that is configurable to transmit or block ambient light (e.g., ambient light 490) and a display (e.g., display 410) configured to output image light (e.g., image light 492). The window and the display define an interior space of the display device. The display device also includes an optical assembly (e.g., optical assembly 412) disposed in the interior space of the display device. The optical assembly includes at least one substrate (e.g., substrate 510, 610, 620, 710) that provides a first curved surface (e.g., surfaces 510-1, 610-2, 710-1) and a second surface (e.g., surfaces 510-2, 620-1, 720-2). At least a portion of the first curved surface has a first radius of curvature and the second surface has a second radius of curvature that is different from the first radius of curvature. The optical assembly also includes a beam splitter (e.g., beam splitter 512, 612, 712) on the first curved surface, a reflector (e.g., reflector 514, 614, 714) on the second surface, and an optical retarder (e.g., optical retarder 516, 516', 616, 716) disposed between the beam splitter and the reflector. The optical assembly is configured to receive the image light at the first curved surface and reflect the image light at the reflector and subsequently, at the beam splitter before outputting the image light from the reflector. The image light is transmitted through the optical assembly at a first optical power. The optical assembly is also configured to transmit ambient light at a second optical power that is less than the first optical power. The ambient light is transmitted through peripheral portions (e.g., corresponding to peripheral portion 412-P of optical assembly 412) of the beam splitter and reflector without reflection at the reflector. In some embodiments, the display includes a quarter-wave plate configured to convert light from a linear polarization to a circular polarization and vice versa.

In some embodiments, the at least one substrate includes a first substrate (e.g., substrate 510, 710) and the first curved surface (e.g., surfaces 510-1, 710-1) and the second surface (e.g., surfaces 510-2, 720-2) are opposing surfaces of the first substrate. In some embodiments, the second radius of curvature is smaller than the first radius of curvature. In some embodiments, the first light (e.g., image light 492) and the second light (e.g., ambient light 490) are received at the first curved surface and output from the second surface.

In some embodiments, the at least one substrate further includes a second substrate (e.g., substrate 520) having a third surface (e.g., surface 520-1) and a fourth surface (e.g., surface 520-2) that is opposite to the third surface. The third surface has the second radius of curvature and is coupled to the second surface (e.g., surface 510-2). At least a portion of the fourth surface has the first radius of curvature and is substantially parallel to the first curved surface (e.g., surface 510-1).

In some embodiments, the first optical retarder (e.g., optical retarder 516') is flat (e.g., the third radius of curvature is infinity.

In some embodiments, the at least one substrate includes a third substrate (e.g., substrate 610) providing the first curved surface (e.g., curved surface 610-2) and a fourth substrate (e.g., substrate 620) providing the second surface (e.g., surface 620-1). The optical retarder (e.g., optical retarder 616) is on the second surface. The third substrate is disposed proximate to and spaced apart from the fourth substrate by distance D1.

In some embodiments, the at least one substrate includes a fifth substrate (e.g., substrate 710) and a sixth substrate (e.g., substrate 720). The first curved surface (e.g., curved surface 710-1) and the second surface (e.g., surface 710-2) are opposing surfaces of the fifth substrate. The second surface is flat. The sixth substrate has a fifth surface (e.g., surface 720-1) and a sixth surface (e.g., surface 720-2) opposite the fifth surface. The fifth surface has the first radius of curvature and is coupled to the first curved surface. The sixth surface is substantially parallel (e.g., forms an angle less than 1 degree) with the second surface (e.g., the sixth surface is flat). In some embodiments, the optical retarder (e.g., optical retarder 716) is flat.

In some embodiments, the optical assembly (e.g., optical assembly 701, 702) further includes a field lens (e.g., field lens 730, 740) having a seventh surface (e.g., surface 730-1, 740-1) and an eighth surface (e.g., surface 730-2, 740-2) opposite to the seventh surface. The seventh surface is a flat surface that is substantially parallel (e.g., forms an angle less than 1 degree) to each of the second surface and the sixth surface. The eighth surface has a fourth radius of curvature and is spaced apart from the sixth surface (e.g., surface 720-1) by at least distance D2 or distance D3.

In some embodiments, the field lens (e.g., field lens 740) includes a plurality of Fresnel structures.

In some embodiments, the sixth surface includes (e.g., surface 720-1) a second optical retarder (e.g. optical retarder 718) and the at least one substrate further includes a seventh substrate (e.g., substrate 750) having a ninth surface (e.g., surface 750-1) and a tenth surface (e.g., surface 750-2) opposite to and substantially parallel with the ninth surface. The tenth surface includes a second beam splitter (e.g., beam splitter 719). Each of the ninth surface and the tenth surface has a fifth radius of curvature and the tenth surface is spaced apart from the sixth surface (e.g., surface 720-1) by at least distance D4.

In some embodiments, the display (e.g., display 410) has a size (e.g., diagonal dimension d) that is between 1.3 inches and 3.2 inches (e.g., 1.3 inches≤d≤3.2 inches).

In accordance with some embodiments, a method (e.g., method 800) of transmitting light through an optical assembly (e.g., optical assembly 412, 500-502, 600, 700-703) includes transmitting image light (e.g., image light 492). Transmitting the image light includes receiving the image light at a beam splitter (e.g., beam splitter 512, 612, 712) on a first curved surface (e.g., surfaces 510-1, 610-2, 710-1) provided a first substrate (e.g., substrate 510, 610, 620, 710). At least a portion of the first curved surface has a first radius of curvature. Transmitting the image light also includes reflecting the image light at a reflector (e.g., reflector 514, 614, 714) on a second surface provided by the first substrate or a second substrate (e.g., substrate 620). At least a portion of the second surface has a second radius of curvature that is different from the first radius of curvature. Transmitting the image light further includes reflecting the image light at the beam splitter and outputting the image light from the reflector at a first optical power. The method also includes transmitting ambient light (e.g., ambient light 490) through a peripheral portion (e.g., corresponding to peripheral portion 412-P of optical assembly 412) of the optical assembly at a second optical power that is less than the first optical power. Transmitting the ambient light includes receiving the ambient light at a peripheral portion of the first surface, and transmitting the ambient light through a peripheral portion of the reflector without reflection at the reflector.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly comprising:
   at least one substrate providing a first surface and a second surface;
   a first beam splitter on the first surface;
   a reflector on the second surface;
   a first optical retarder disposed between the first beam splitter and the reflector, wherein:
      the optical assembly is configured to:
         receive first light at the first surface, and reflect the first light at the reflector and subsequently at the first beam splitter before outputting the first light from the reflector, whereby the first light is transmitted through the optical assembly at a first optical power; and
         transmit second light at a second optical power that is less than the first optical power, the second light being transmitted through peripheral portions of the first beam splitter and the reflector without reflection at the reflector;
      the first light has a first polarization and wavelengths in a predetermined wavelength range;
      the second light includes light having a second polarization orthogonal to the first polarization and light having wavelengths outside the predetermined wavelength range;
      the at least one substrate includes a fifth substrate and a sixth substrate;
      the first surface and the second surface are opposing surfaces of the fifth substrate;
      the second surface is flat;
      the sixth substrate has a fifth surface and a sixth surface opposite to the fifth surface;
      the fifth surface is coupled to the first surface; and
      the sixth surface is substantially parallel to the second surface; and
   a field lens having a seventh surface and an eighth surface opposite to the seventh surface, wherein:
      the seventh surface is a flat surface that is substantially parallel to each of the second surface and the sixth surface; and
      the eighth surface is spaced apart from the sixth surface.

2. The optical assembly of claim 1, wherein:
   the at least one substrate includes a first substrate; and
   the first surface and the second surface are opposing surfaces of the first substrate.

3. The optical assembly of claim 2, wherein:
   the at least one substrate further includes a second substrate having a third surface and a fourth surface opposite to the third surface;
   the third surface is coupled to the second surface; and
   at least a portion of the fourth surface is substantially parallel to the first surface.

4. The optical assembly of claim 1, wherein the reflector is a narrow band reflector.

5. The optical assembly of claim 1, wherein:
   the at least one substrate includes a third substrate providing the first surface and a fourth substrate providing the second surface;
   the first optical retarder is on the second surface; and
   the third substrate is disposed proximate to and spaced apart from the fourth substrate.

6. The optical assembly of claim 1, wherein the field lens includes a plurality of Fresnel structures.

7. The optical assembly of claim 1, wherein:
   the sixth surface includes a second optical retarder;
   the at least one substrate further includes a seventh substrate having a ninth surface and a tenth surface opposite to and substantially parallel with the ninth surface;
   the tenth surface includes a second beam splitter; and
   the tenth surface is spaced apart from the sixth surface.

8. A display device comprising:
   a window configurable to transmit or block ambient light;
   a display configured to output image light, the window and the display defining an interior space;
   an optical assembly disposed in the interior space of the display device, the optical assembly including:
      at least one substrate providing a first surface and a second surface;
      a first beam splitter on the first surface;
      a reflector on the second surface;
      a first optical retarder disposed between the first beam splitter and the reflector, wherein:
         the optical assembly is configured to:
            receive the image light at the first surface, and reflect the image light at the reflector and subsequently at the first beam splitter before outputting the image light from the reflector, whereby the image light is transmitted through the optical assembly at a first optical power; and
            transmit the ambient light at a second optical power that is less than the first optical power, the ambient light being transmitted through peripheral portions of the first beam splitter and the reflector without reflection at the reflector;
         the at least one substrate includes a fifth substrate and a sixth substrate;
         the first surface and the second surface are opposing surfaces of the fifth substrate;
         the second surface is flat;
         the sixth substrate has a fifth surface and a sixth surface opposite the fifth surface;
         the fifth surface is coupled to the first surface; and
         the sixth surface is substantially parallel with the second surface; and
      a field lens having a seventh surface and an eighth surface opposite to the seventh surface, wherein:
         the seventh surface is a flat surface that is parallel to each of the second surface and the sixth surface; and
         the eighth surface is spaced apart from the sixth surface.

9. The display device of claim 8, wherein:
the at least one substrate includes a first substrate; and
the first surface and the second surface are opposing surfaces of the first substrate.

10. The display device of claim 9, wherein:
the at least one substrate further includes a second substrate having a third surface and a fourth surface opposite to the third surface;
the third surface is coupled to the second surface; and
at least a portion of the fourth surface is substantially parallel to the first surface.

11. The display device of claim 8, wherein the reflector is a narrow band reflector.

12. The display device of claim 11, wherein:
the display includes one or more narrow band source elements such that the image light has wavelengths in a predetermined wavelength range.

13. The display device of claim 8, wherein:
the at least one substrate includes a third substrate providing the first surface and a fourth substrate providing the second surface;
the first optical retarder is on the second surface; and
the third substrate is disposed proximate to and spaced apart from the fourth substrate.

14. The display device of claim 8, wherein the field lens includes a plurality of Fresnel structures.

15. The display device of claim 8, wherein:
the sixth surface includes a second optical retarder;
the at least one substrate further includes a seventh substrate having a ninth surface and a tenth surface opposite to and substantially parallel with the ninth surface;
the tenth surface includes a second beam splitter; and
the tenth surface is spaced apart from the sixth surface.

16. A method of transmitting light through the optical assembly of claim 1, the method comprising:
transmitting the first light at the first surface and reflecting the first light at the reflector and subsequently at the first beam splitter before outputting the first light from the reflector, whereby the first light is transmitted through the optical assembly at the first optical power; and
transmitting the second light at the second optical power that is less than the first optical power, the second light being transmitted through peripheral portions of the first beam splitter and the reflector without reflection at the reflector.

* * * * *